US007339537B2

(12) United States Patent
Hunsberger

(10) Patent No.: US 7,339,537 B2
(45) Date of Patent: Mar. 4, 2008

(54) CAPACITIVE DRIVE ANTENNA AND AN AIR VEHICLE SO EQUIPPED

(75) Inventor: Harold Kregg Hunsberger, Simi Valley, CA (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 11/163,271

(22) Filed: Oct. 12, 2005

(65) Prior Publication Data

US 2007/0091001 A1 Apr. 26, 2007

Related U.S. Application Data

(60) Provisional application No. 60/623,336, filed on Oct. 28, 2004.

(51) Int. Cl.

| | |
|---|---|
| ***H01Q 1/28*** | (2006.01) |
| ***F41G 7/00*** | (2006.01) |
| ***F41G 9/00*** | (2006.01) |
| ***F41G 7/20*** | (2006.01) |
| ***F42B 10/00*** | (2006.01) |
| ***F42B 15/00*** | (2006.01) |
| ***F42B 15/04*** | (2006.01) |
| ***F42B 15/01*** | (2006.01) |
| ***G06F 19/00*** | (2006.01) |

(52) U.S. Cl. ...................... 343/705; 343/705; 343/708; 244/3.1; 244/3.11; 244/3.12; 244/3.13; 244/3.14; 244/3.15; 244/3.16; 244/3.17; 244/3.18; 244/3.19; 244/3.24

(58) Field of Classification Search ................ 343/705, 343/708, 718, 763; 244/3.1, 3.11–3.19, 3.24
See application file for complete search history.

(56) References Cited

U.S. PATENT DOCUMENTS

| | | | | |
|---|---|---|---|---|
| 2,235,139 | A * | 3/1941 | Bruce | 343/708 |
| 2,614,219 | A * | 10/1952 | Henry | 343/708 |
| 2,908,000 | A | 10/1959 | Robinson, Jr. | |
| 2,932,026 | A * | 4/1960 | Le et al. | 343/708 |
| 5,825,332 | A | 10/1998 | Camacho et al. | 343/708 |
| 6,097,343 | A | 8/2000 | Goetz et al. | 373/708 |
| 6,300,908 | B1 | 10/2001 | Jecko et al. | 343/700 |
| 6,653,980 | B2 | 11/2003 | Ceccom et al. | 343/705 |
| 2003/0063036 | A1 | 4/2003 | Sato et al. | 343/702 |
| 2004/0100408 | A1 | 5/2004 | Okado | 343/700 |

FOREIGN PATENT DOCUMENTS

DE 3801610 A1 * 8/1989

* cited by examiner

*Primary Examiner*—Hoang V. Nguyen
*Assistant Examiner*—Robert Karacsony
(74) *Attorney, Agent, or Firm*—TraskBritt

(57) ABSTRACT

Disclosed are antenna embodiments and air vehicles so equipped that include a first antenna component, and a second antenna component, separated by a free space gap, where the antenna embodiments are adapted to capacitively couple the first antenna component and the second antenna component across one or more portions of the free space gap and where the first antenna component member has a degree or axis of rotation, relative to the second antenna component.

15 Claims, 24 Drawing Sheets

CAPACITIVE DRIVE ANTENNA AND AN AIR VEHICLE SO EQUIPPED

CROSS-REFERENCE TO RELATED APPLICATION

This application claims the benefit of provisional application No. 60/623,336, filed Oct. 28, 2004, to Harold Kregg Hunsberger entitled "Capacitive Drive Antenna and an Air Vehicle So Equipped," filed Oct. 28, 2004, the disclosure of which is hereby incorporated by reference herein, in its entirety, for all purposes.

BACKGROUND

1. Field of the Invention

The invention, in its several embodiments, relates to capacitive antennas and particularly to capacitive antenna embodiments having a free space gap bounded by a first capacitive component and a second capacitive component in rotatable proximity to the first capacitive component and the invention, in its several embodiments, also relates to air vehicles so equipped.

2. State of the Art

The gain bandwidth product of a radiating element, such as an antenna for effecting radiofrequency communication, is proportional to volume. Efficient radiating structures that operate over a wide bandwidth require a minimum effective volume of 0.065 wavelength-cubed. This relates to an effective volume in the UHF band of around 2,700 cubic inches or a required volume, if completely contained in a missile or some other air vehicle, illustrated by a polyhedron having rectangular faces with dimensions of about 17.4 inches, 17.4 inches and 8.7 inches. A conventional antenna for air vehicles such as missiles is typically constrained to an electrically small antenna of approximately 4 inches in width by 8 inches in length by less than 1.5 inches in depth. Such volumetric constraints severely limit the bandwidth and efficiency of a conventional antenna.

SUMMARY

The invention, in its several embodiments, comprises an antenna that includes a first member, also termed a first antenna component, and a second member, also termed a second antenna component, that are separated by a free space gap, where the first member may be movably mounted, such as rotatably mounted, that is, having a degree of rotation, relative to the second member and where the antenna is adapted to capacitively couple the first and second members across portions of the free space gap. The first member may include a conductive first edge and an extension for engaging with the second member where the second member of the antenna is adapted to receive the extension. The extension may be a third member for those embodiments where both the first member and second member are adapted to receive the third member. The extension or the third member provides a principal axis of rotation about which the first member is adapted to rotate relative to the second member. The second member may include a conductive first surface proximate to at least a first portion of the conductive first edge of the first member and a conductive second surface of the second member proximate to at least a second portion of the conductive first edge of the first member. The first member may comprise at least a portion of a movable airfoil, for example a control surface, of an air vehicle, and the second member may comprise, or be carried by, the fuselage or other structure of the air vehicle proximate to the first member.

Accordingly, as an open-ended slot antenna or a dipole antenna, by way of example and not limitation, the antenna may be adapted to generate capacitive coupling between at least a first portion of the conductive first edge of the first member and at least a portion of the conductive first surface of the second member across a free space gap formed by at least a first portion of the conductive first edge that is proximate to the portion of the conductive first surface of the second member. In addition, for dipole embodiments, the antenna may be adapted to generate capacitive coupling between at least a second portion of the conductive first edge of the first member and at least a portion of the conductive second surface of the second member across a second free space gap formed by the second portion of the conductive first edge of the first member that is proximate to the portion of the conductive second surface of the second member. The first member of the antenna may be electrically grounded to the second member via the extension or third member and may be capacitively charged via a transmission line connecting the conductive second surface with a transmitting subsystem.

The use of at least one control surface of the missile extends the effective volume of a radiating structure without needing to use the limited internal missile volume. The present invention, as disclosed in the context of a number of exemplary embodiments, enables efficient coupling to a control surface by taking advantage of existing missile components, e.g., the missile skin and the wings, without modification. In light of internal volume and allowed surface area limitations of missile systems, the present invention minimizes both the internal and external volumes required to support efficient coupling to free space by incorporating existing missile components as the radiating element. The volume of the control surface extends the fields away from the missile, increasing substantially the efficiency and bandwidth of the antenna.

The present invention may be characterized as a radiating element external to a body of an air vehicle and capacitively coupled to a drive circuit disposed within the vehicle. More specifically, the radiating element may comprise a movable control surface of the vehicle rotatably mounted thereto. The present invention encompasses air vehicles including a capacitive drive antenna according to the present invention.

BRIEF DESCRIPTION OF THE DRAWINGS

For a more complete understanding of the present invention in its several embodiments, and for further features and advantages, reference is now made to the following description taken in conjunction with the accompanying drawings, in which.

As used herein, the term "exemplary" is meant by way of example to facilitate the understanding of the reader, and does not indicate any particular preference for a particular element, feature, configuration or sequence.

DETAILED DESCRIPTION

Figure 1A:
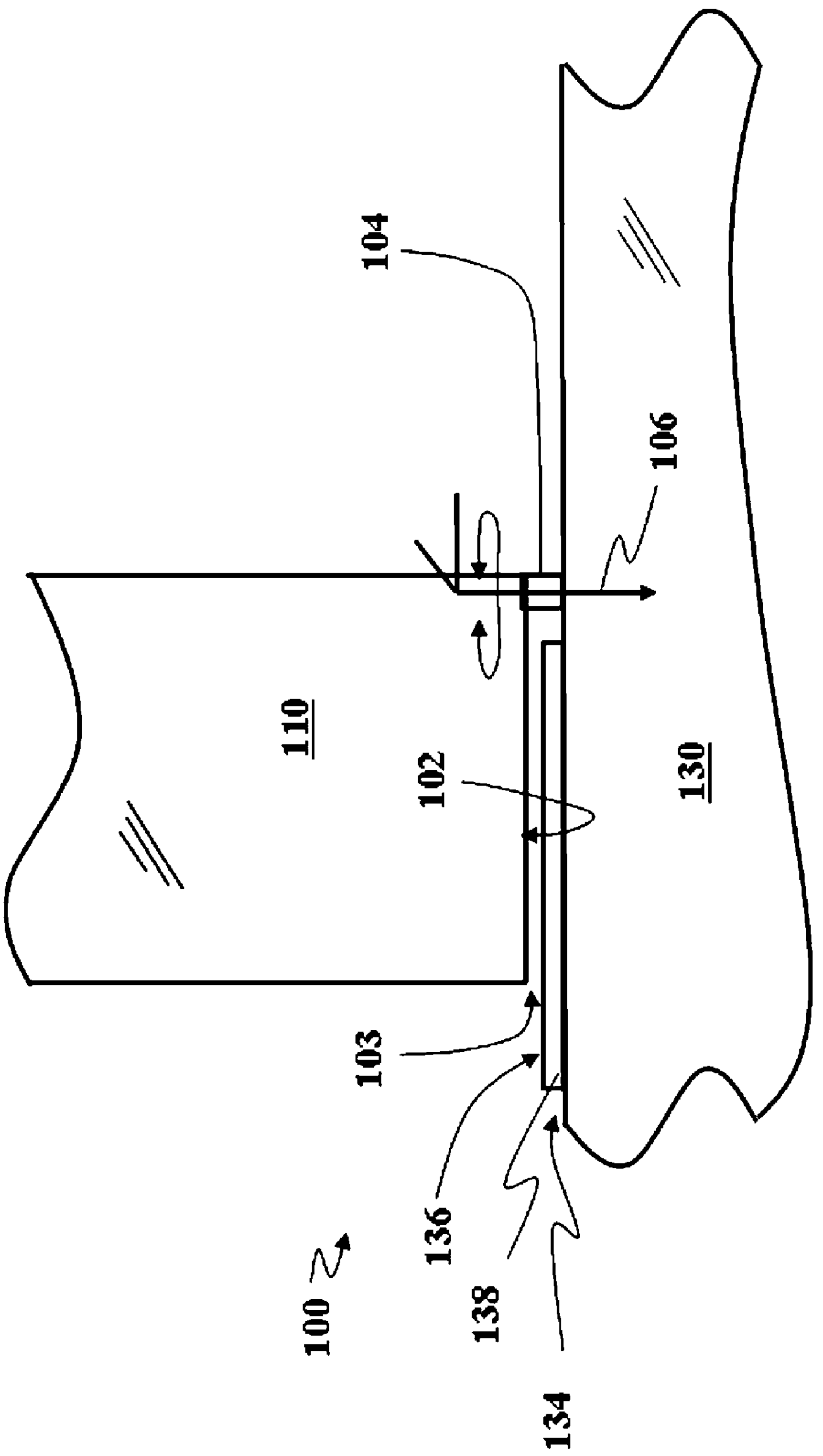
FIG. 1A illustrates an exemplary single quarter-wavelength open-ended slot antenna embodiment of the present invention.

The invention, in several exemplary embodiments, is illustrated by an example in FIG. 1A as a single quarter-wavelength open-ended slot antenna 100 having a first component or member 110 that has a conductive first edge 102 and is adapted to receive a third member 104 having a principal axis of rotation 106 and a second component or member 130 adapted to receive the third member 104, wherein the first member 110 is mechanically connected and electrically grounded to the second member 130 via the third member 104 and the first member 110 is adapted to rotate relative to the second member 130 about the principal axis of the rotation 106. A coupling element 134 is detachably attached to the second member 130. The third member 104 may be fixedly attached to the first member 110 and attached, with at least one axis of articulation, such as in rotation, to the second member 130 to afford a rotation of the first member 110 and third member 104, as a static extension of the first member 110, with the application of torque to the third member 104 at the second member 130. The coupling element 134 may have an electrically insulating layer 138 having a top side and a bottom side where the electrically insulating layer 138 is interposed between the second member 130 and a conductive second surface 136 and where the bottom side of the insulating layer 138 may be conformal to the second member 130. The insulating layer 138 may be a dielectric material. The conductive second surface 136 may be charged via an insulated transmission line (not shown) such as a coaxial cable connected to a power source such as a radio frequency transmitter (also not shown) to generate a capacitive coupling between at least a first portion of the conductive first edge 102 of the first member 110 and at least a portion of the conductive second surface 136 of the second member 130 across a first free space gap 103 formed by the proximity of a portion of the conductive first edge 102 and a portion of the conductive second surface 136 of the second member 130.

Figure 1B:
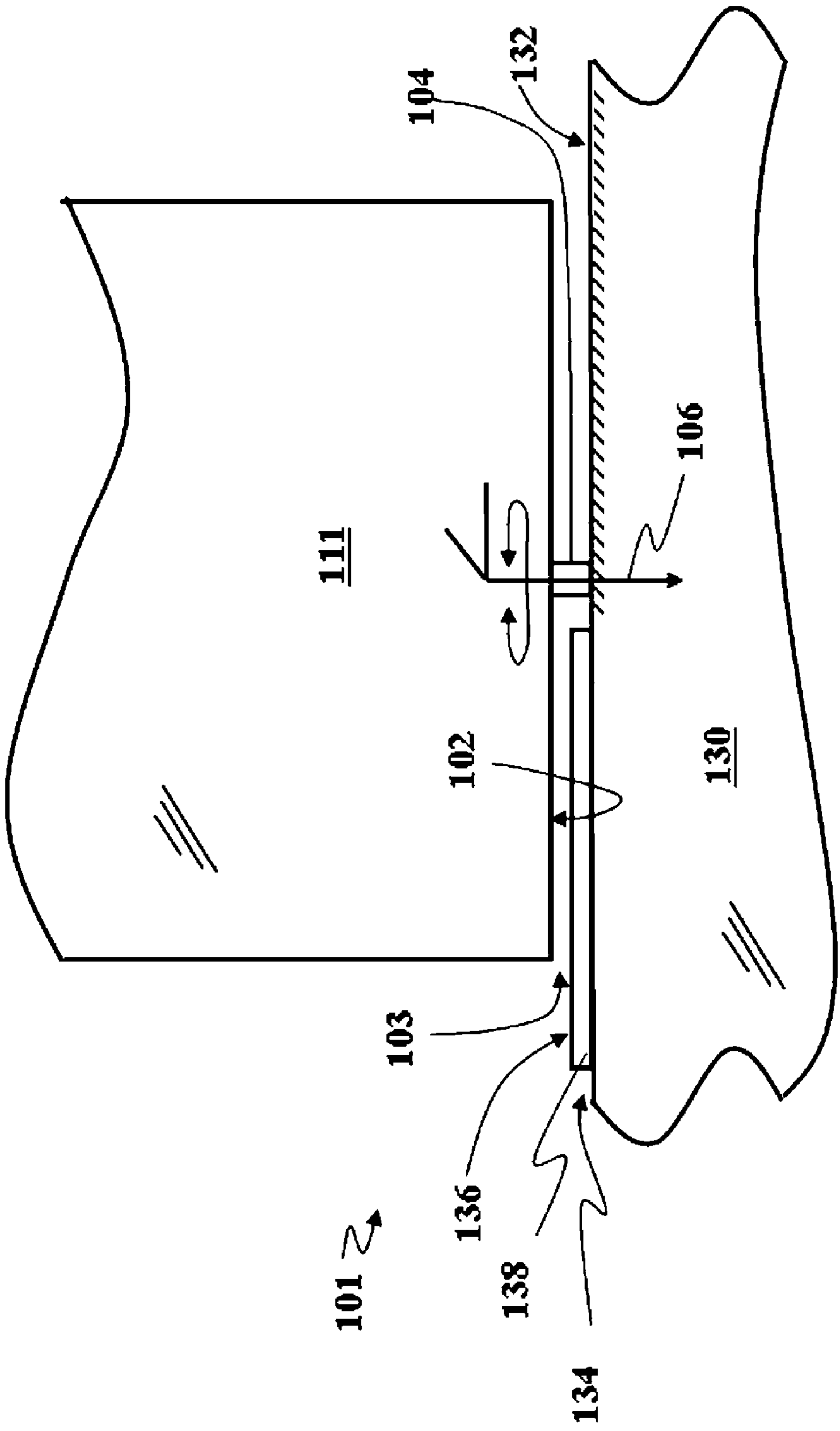
FIG. 1B illustrates an exemplary dipole antenna embodiment of the present invention.

By extending the first member 110 of FIG. 1A beyond the third member 104, FIG. 1B illustrates an example of a dipole antenna 101 embodiment having a first member 111 that has a conductive first edge 102 and is adapted to receive the third member 104 having a principal axis of rotation 106 and a second member 130 adapted to receive the third member 104, the second member 130 having a conductive first surface 132 proximate to at least a portion of the conductive first edge 102, wherein the first member 111 is mechanically connected and electrically grounded to the second member 130 via the third member 104, and the first member 111 is adapted to rotate relative to the second member 130 about the principal axis of rotation 106. A coupling element 134 may be detachably attached to the second member 130.

The third member 104 may be fixedly attached to the first member 111 and attached, with at least one axis of articulation, such as in rotation, to the second member 130 to afford a rotation of the first member 111 and third member 104, as a static extension of the first member 111, with the application of torque to the third member 104 at the second member 130. As with the open-ended slot antenna of FIG. 1A, the conductive second surface 136 may be charged via an insulated transmission line (not shown) such as a coaxial cable, connected to a power source such as a radio frequency transmitter (also not shown) to generate a capacitive coupling between at least a first portion of the conductive first edge 102 of the first member 111 and at least a portion of the second conductive surface 136 of the second member 130—across a first free space gap 103 formed by the proximity of the first portion of the conductive first edge 102 and a portion of the conductive second surface 136. In turn, a capacitive coupling is generated between at least a second portion of the conductive first edge 102 of the first member 111 and at least a portion of the conductive first surface 132 of the second member 130 across a second free space gap formed by the proximity of a second portion of the conductive first edge 102 and a portion of the conductive first surface 132 of the second member 130. Accordingly, the dipole antenna example 101 may be described as having an active slot and a passive slot. That is, the dipole antenna example 101 has: (a) a first free space gap or slot 103 associated with the coupling or drive element 134 and a portion of the conductive first edge 102 and (b) a second free space gap or slot associated with a portion of the conductive first edge 102 and a portion of the passive, albeit conductive, first surface 132 of the second member 130.

In other embodiments of the dipole antenna 101 and open-ended slot antenna 100, the third member 104 may extend from the second member 130 where the first member 110, 111 is adapted to receive the third member 104 and in some embodiments, both the first member 110, 111 and the second member 130 are adapted to receive the third member 104.

Figures 2A, 2B:
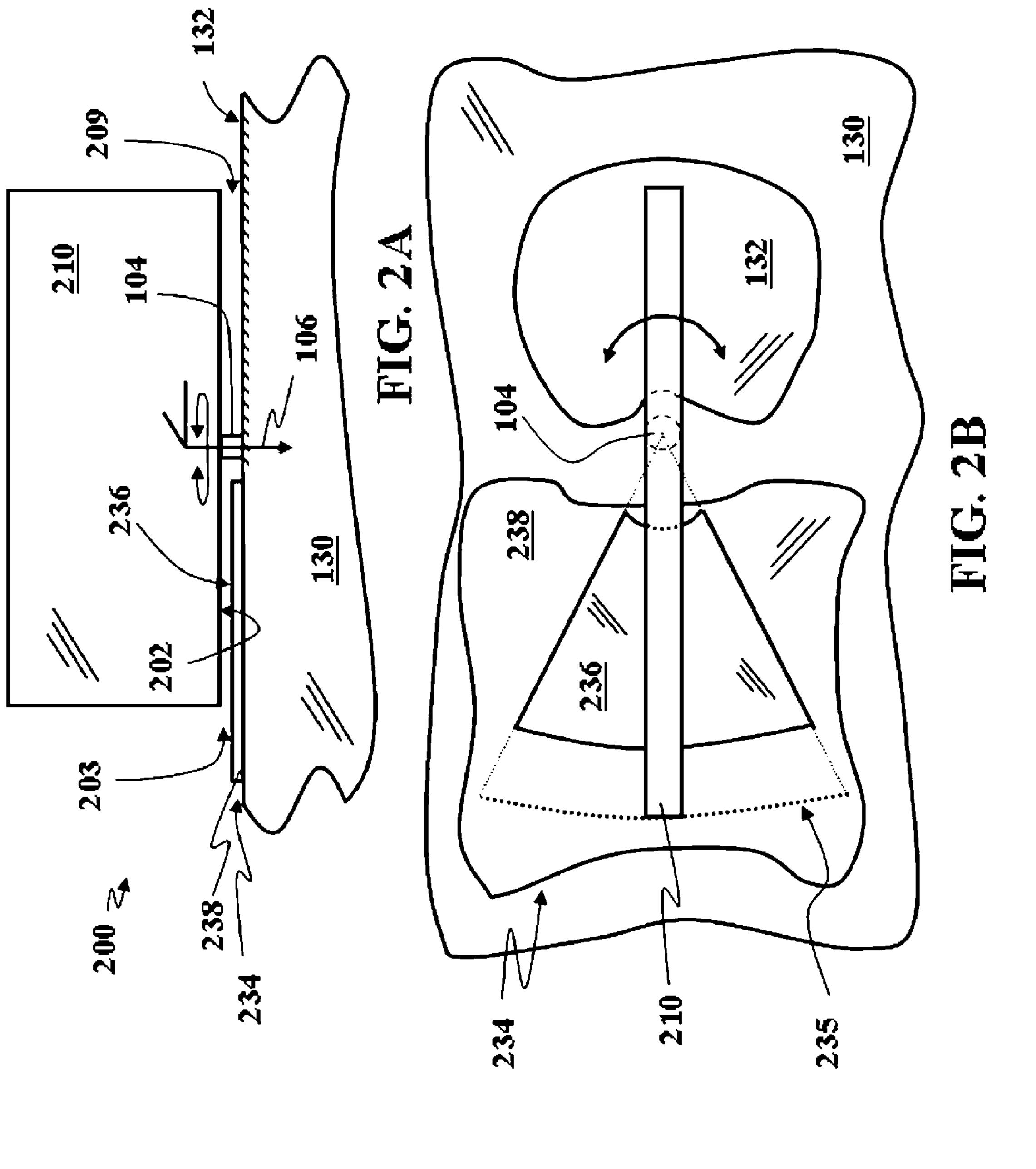
FIG. 2A illustrates an exemplary dipole antenna embodiment of the present invention in a side view.
FIG. 2B illustrates an exemplary dipole antenna embodiment of the present invention in a top view.

In one exemplary embodiment of a dipole antenna 200 illustrated in FIGS. 2A and 2B, the first member 210 is a rectangular solid having a portion of a first rectangular face as the conductive first edge 202 and where rotation of the first member 210 about the principal axis of rotation 106 sweeps a first sector 235 parallel to the plane of a conductive second surface 236. Accordingly, through the rotation of the first member 210 across the angle of the first sector 235, the height of the first free space gap 203 is maintained within an operable range of radio frequency emission. In other embodiments, the conductive second surface 236 of the second member 130 is planar and parallel with the sector 235 swept by the rotation of the first member 210. The conductive second surface 236 of the second member 130 may be interposed between a top layer of dielectric material and the insulating layer 238 of the second member 130. The dielectric material of the top layer may be selected to match the desired frequency of the dipole antenna 200. Further, in some embodiments, the conductive planar first surface 132 of the second member 130 may be coplanar with the conductive planar second surface 236 of the second member 130 so that the height of the first free space gap 203 is substantially equal to the height of the second free space gap 209. In some embodiments, the travel of the conductive first edge 202 of a rotating first member 210 relative to the second member 130 is substantially matched by the contours of the conductive second surface 236 of the second member 130 to obtain an optimal, or least a best practicable, first free space gap 203 within acceptable voltage standing wave ratio (VSWR) ranges.

In some embodiments, the coupling from the conductive second surface 236, that is the coupling element, to the first member 210 is maintained as a constant capacitance through angles of rotation via the span and chord, that is, the shape of the surface region of the conductive second surface 236 of the second member 130, and the height of the conductive second surface 236 of the second member 130 relative the conductive first edge 202. Other embodiments have surface regions of the coupling element 234 shaped to change coupling capacitance between the conductive second surface 236 of the second member 130, and the first member 210 to facilitate via rotation of the first member 210, frequency of operation tuning or impedance matching characteristic adjustments or both.

Figure 3:
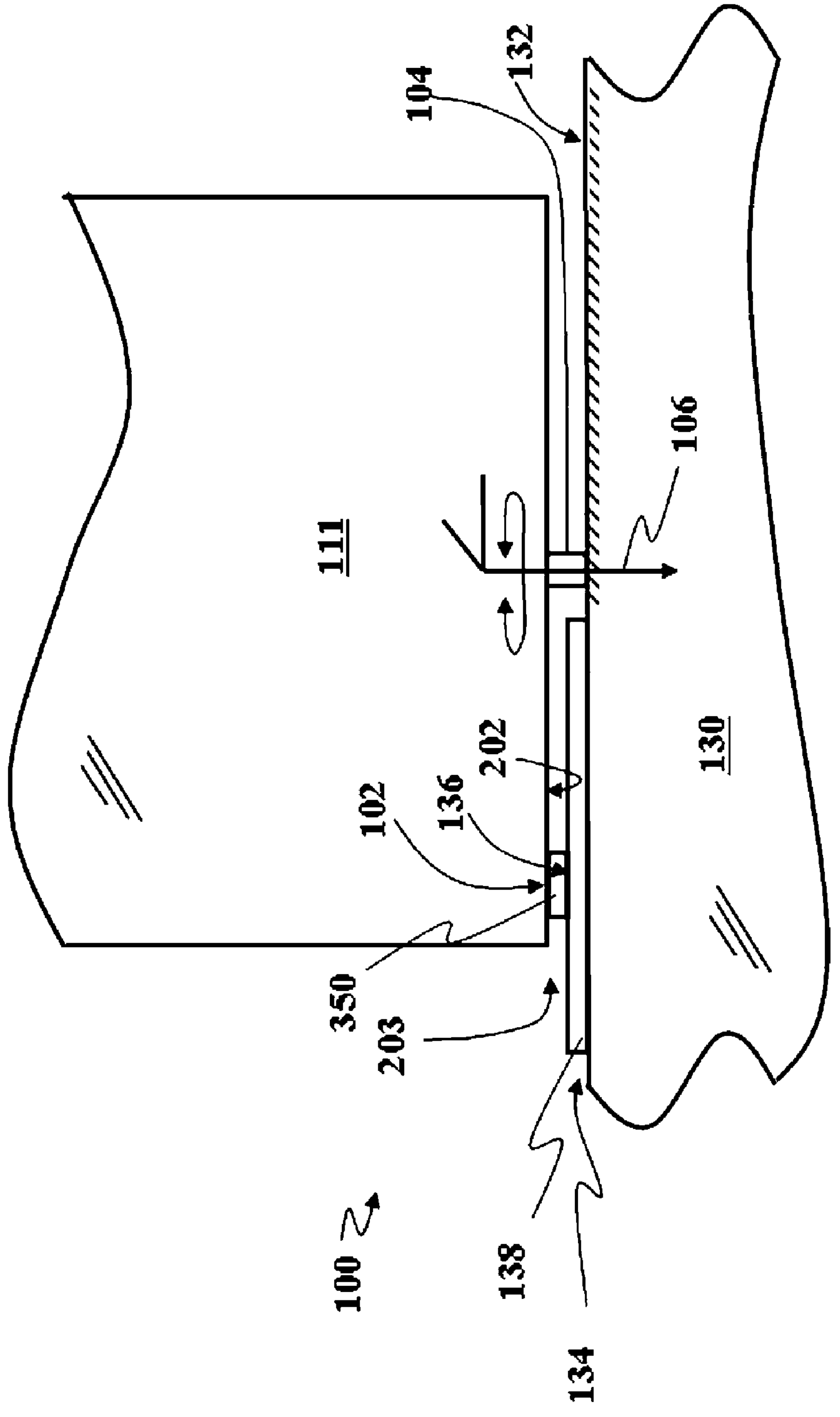
FIG. 3 illustrates an exemplary dipole antenna embodiment of the present invention in a side view.

In another embodiment illustrated in FIG. 3, the conductive second surface 136 is interposed between the insulating layer 138 and a compliant or resilient pressure contact surface member 350 having a top side and a bottom side where the conductive second surface is 136 adapted to maintain a depth from the top side of the pressure contact surface member 350 and is adapted to deform with the compliant pressure contact surface member 350 when the pressure contact surface member 350 is in mechanical contact with a portion of the conductive first edge 102. The pressure contact surface member 350 outer layer may be formed of a dielectric, or electrically insulating, material.

Figure 4A:
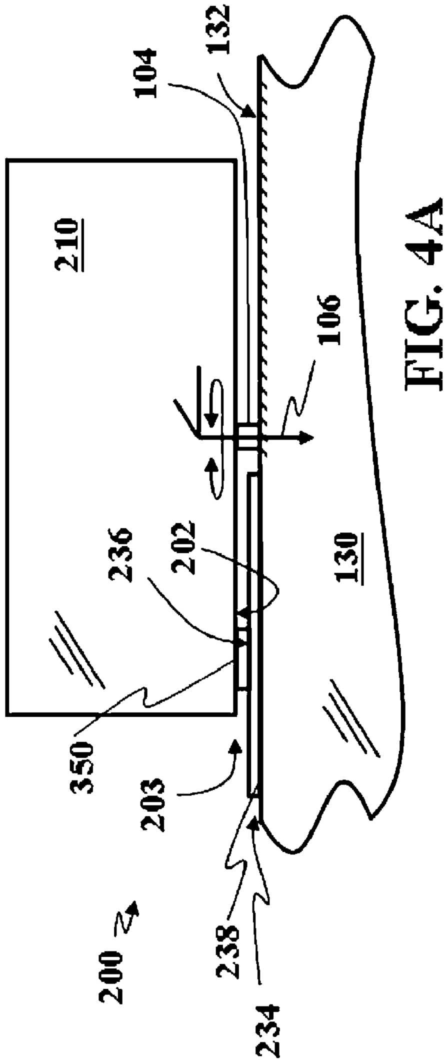
FIG. 4A illustrates an exemplary dipole antenna embodiment of the present invention in a side view.
Figure 4B:
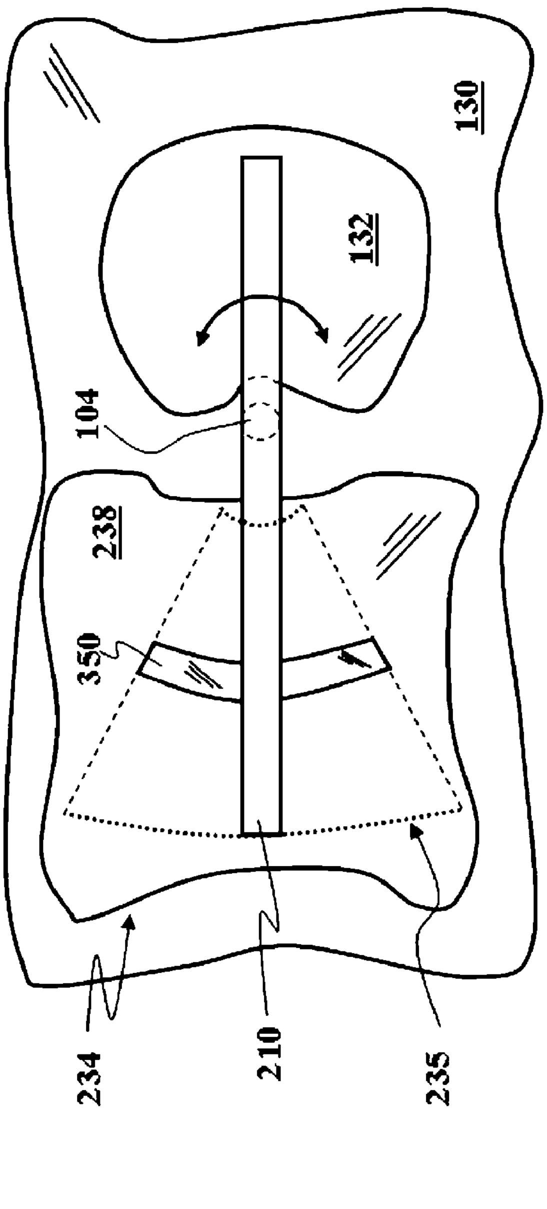
FIG. 4B illustrates an exemplary dipole antenna embodiment of the present invention in a top view.

In the embodiment illustrated in FIGS. 4A and 4B, the first member 210 is a rectangular solid having a portion of a first rectangular face as the conductive first edge 202 and where rotation of the first member 210 about the principal axis of extension 106 sweeps a first sector 235 while in contact with the pressure contact surface member 350 to maintain a standoff distance from the conductive second surface 236. By this example, an insulated pressure contact surface member 350 to the first member 210 may be used to compensate for tolerances. Accordingly, through the rotation of the first member 210 across the angle of the exemplary first sector 235, the height of the first free space gap 203 is maintained within an operable range via the compliance of the pressure contact surface member 350.

The exemplary embodiments of FIGS. 1A, 1B, 2A, 2B, 3, 4A, and 4B illustrate that the first member 110, 111, 210 has a conductive edge 102 that may be a rectangular conductive surface 102, 202 proximate to the second conductive surface 136, 236. One of ordinary skill in the art will appreciate that the conductive edge or a portion of the conductive edge may encompass any shape including substantially planar shapes that may include, for example, a linear, thin rectangle and other substantially planar shapes including triangles, rectangles, polygons and shapes having one or more curvilinear sides. In addition, one of ordinary skill in the art will appreciate that the first member 110, 111, 210 may be of any shape and material compositions and combinations, so long as the portion of the first member 110, 111, 210 proximate to the second conductive surface 136, 236 is adapted to provide a capacitive edge 102, 202.

Figure 5:
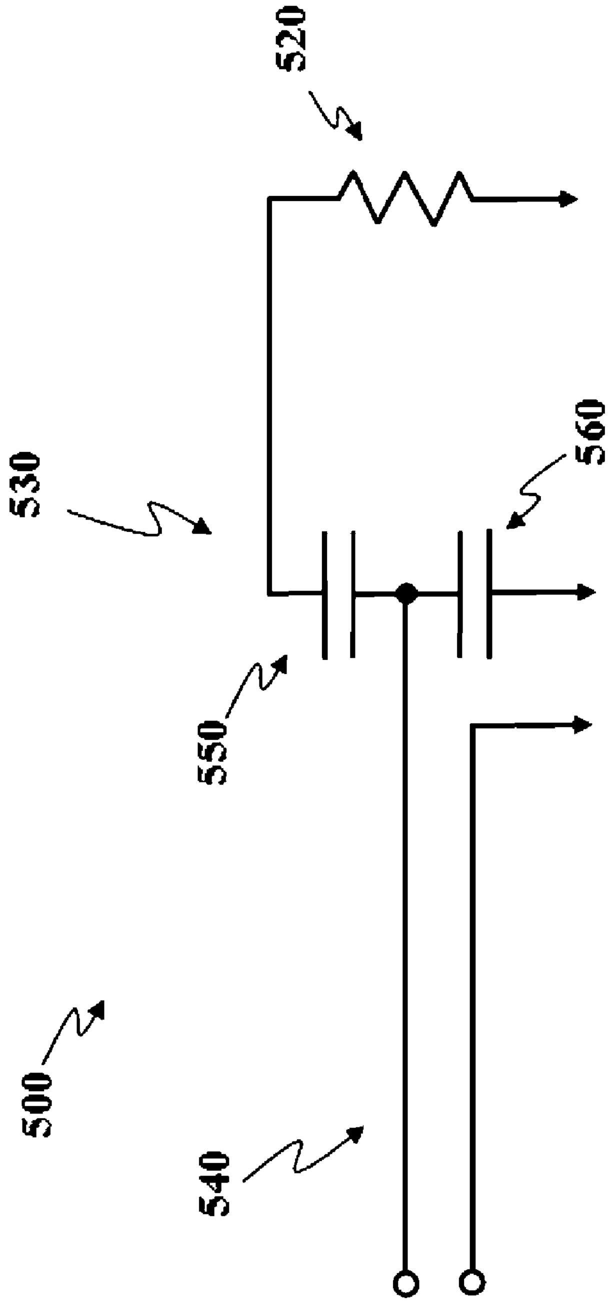
FIG. 5 illustrates an exemplary equivalent circuit of the element as represented by a transformer-driven capacitor voltage divider.

An example of a representative drive circuit is represented in FIG. 5 as a transformer-driven capacitor voltage divider 500 where the center tap is a coax input drive point and a radiation resistance 520 is in parallel with a series capacitance 530. An input transmission line 540, which is dependent on the position of the drive point of the coupling element, affects the real component of admittance. A reactive component of admittance is changed by a shunt capacitance to the surface of the second member 560. From this representation, where a conductive edge of a first member to a conductive second surface capacitance is expressed, for example, as coupling element/wing capacitance 550, and where the conductive first surface to conductive second surface capacitance is expressed by example as coupling element/skin capacitance 560, those of ordinary skill in the art will recognize that a simple transformer may be used to match an antenna center frequency and bandwidth.

In some embodiments, the rotation of the first member may be done to change the polarization sense, obviating the need for a rotary joint for example. In these embodiments, a second conducting surface, having a wide sector angle or an array of sectors having smaller angles than the wide sector, may be used to support extensive angular rotation of the first member.

Figure 6:
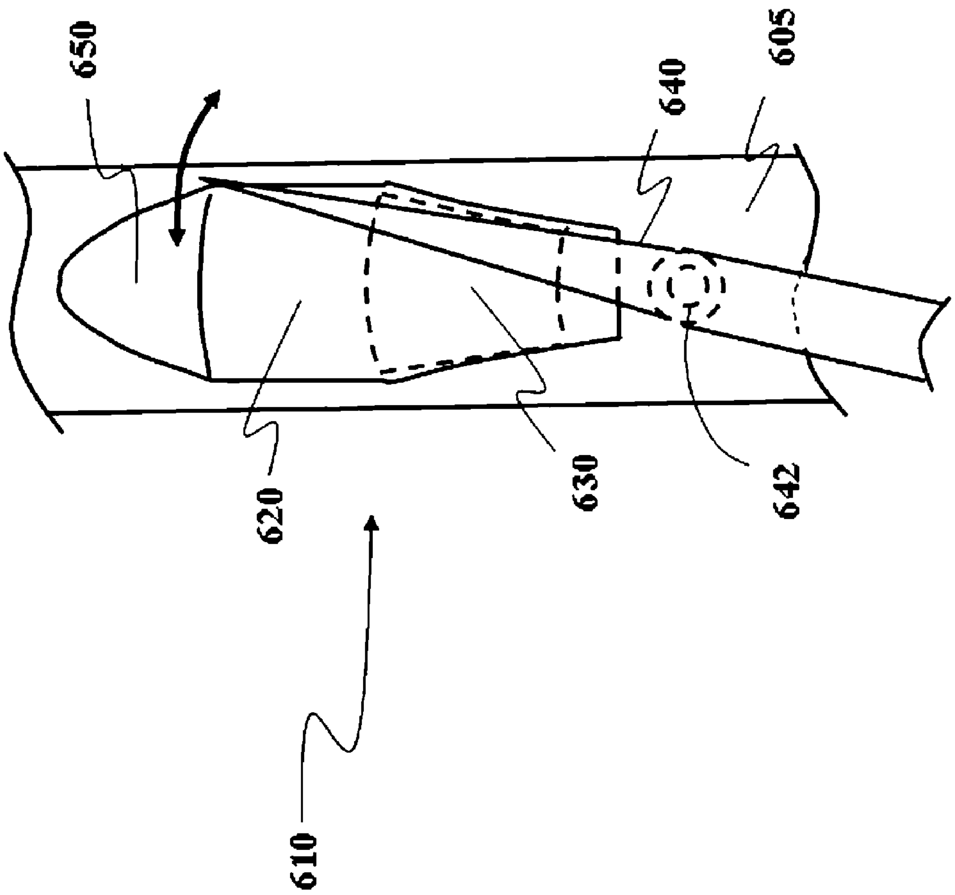
FIG. 6 illustrates a top view of an exemplary aspect of an embodiment of the present invention.
Figure 7:
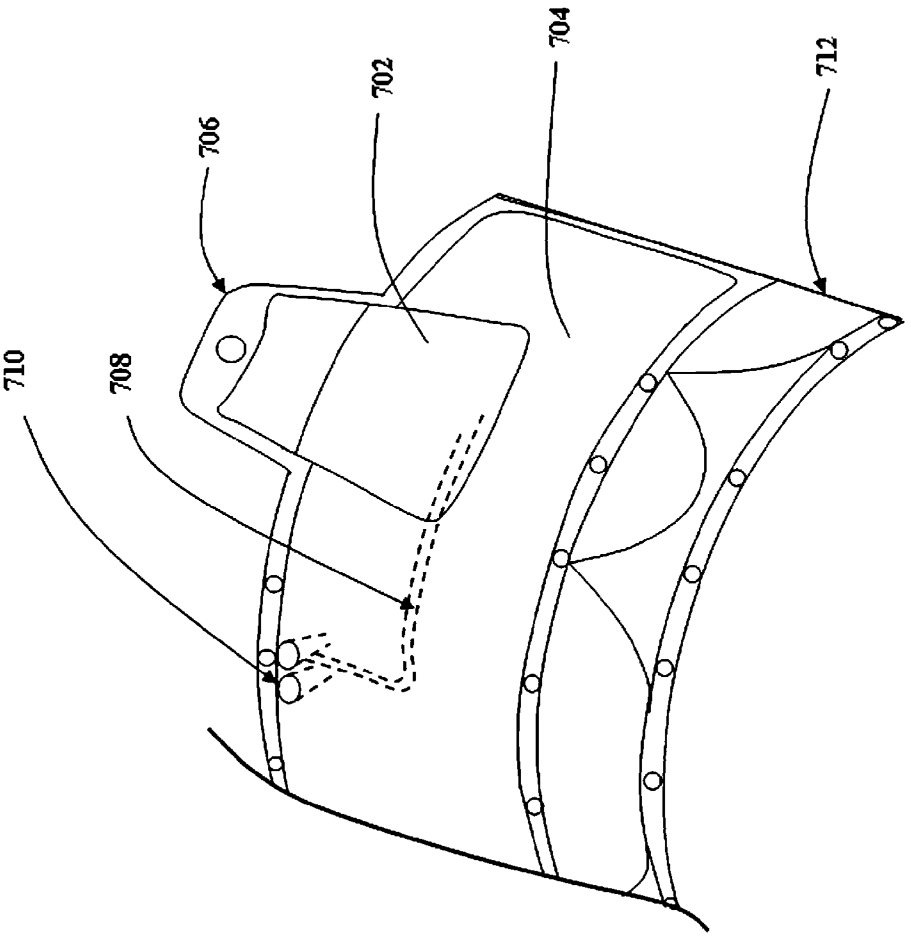
FIG. 7 illustrates a perspective view of an embodiment of the present invention.
Figure 8:
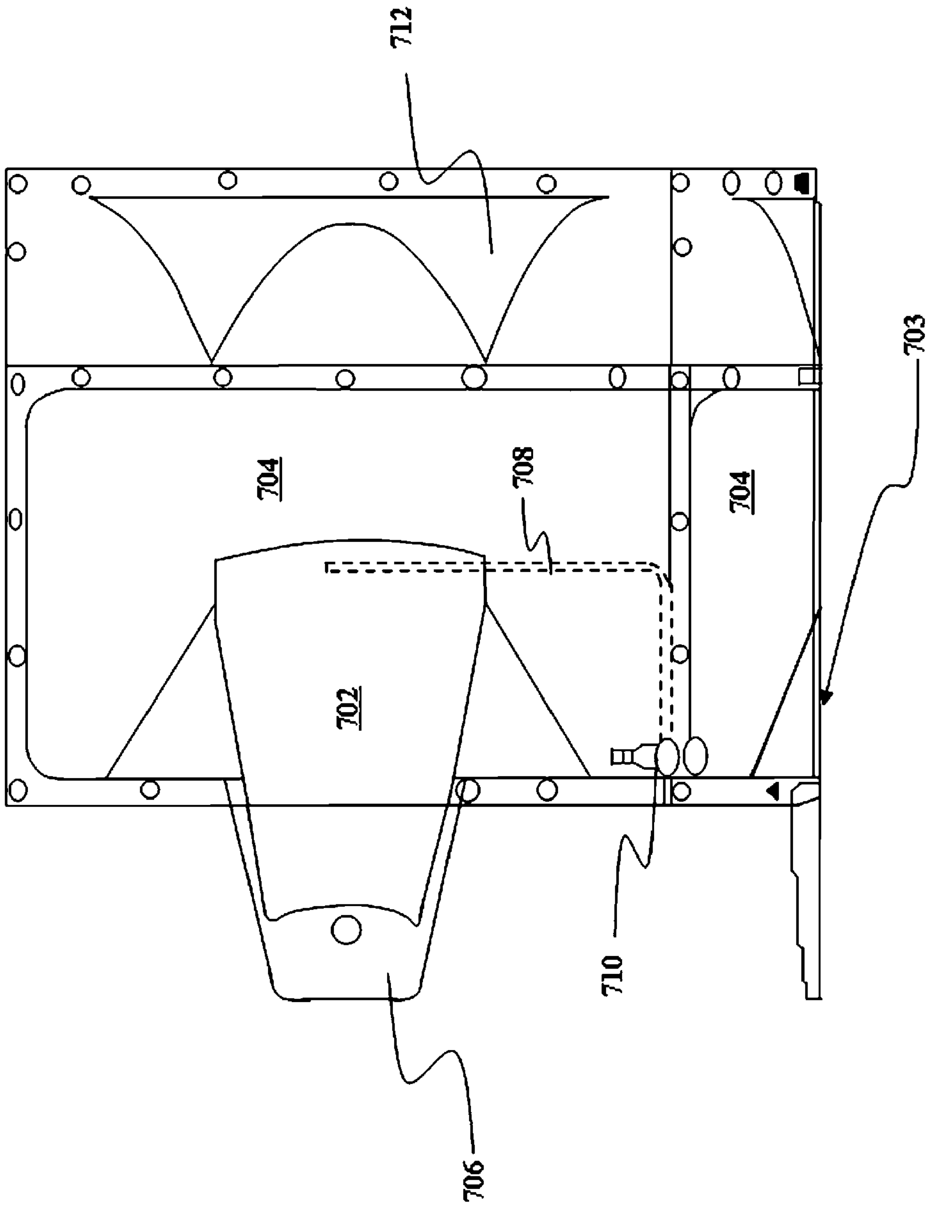
FIG. 8 illustrates a side view of an embodiment of the present invention.
Figure 9:
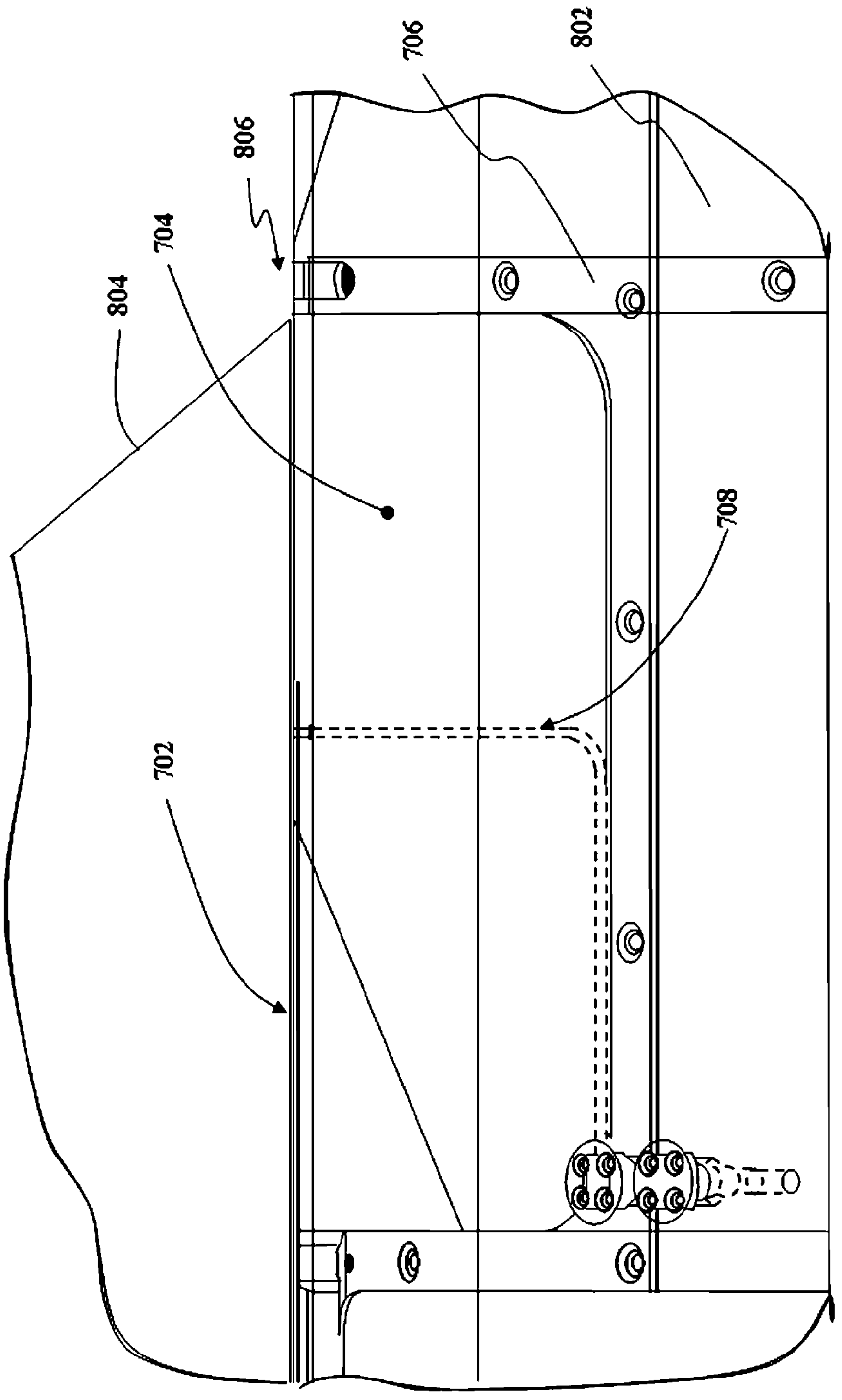
FIG. 9 illustrates a side view of an embodiment of the present invention.
Figure 10:
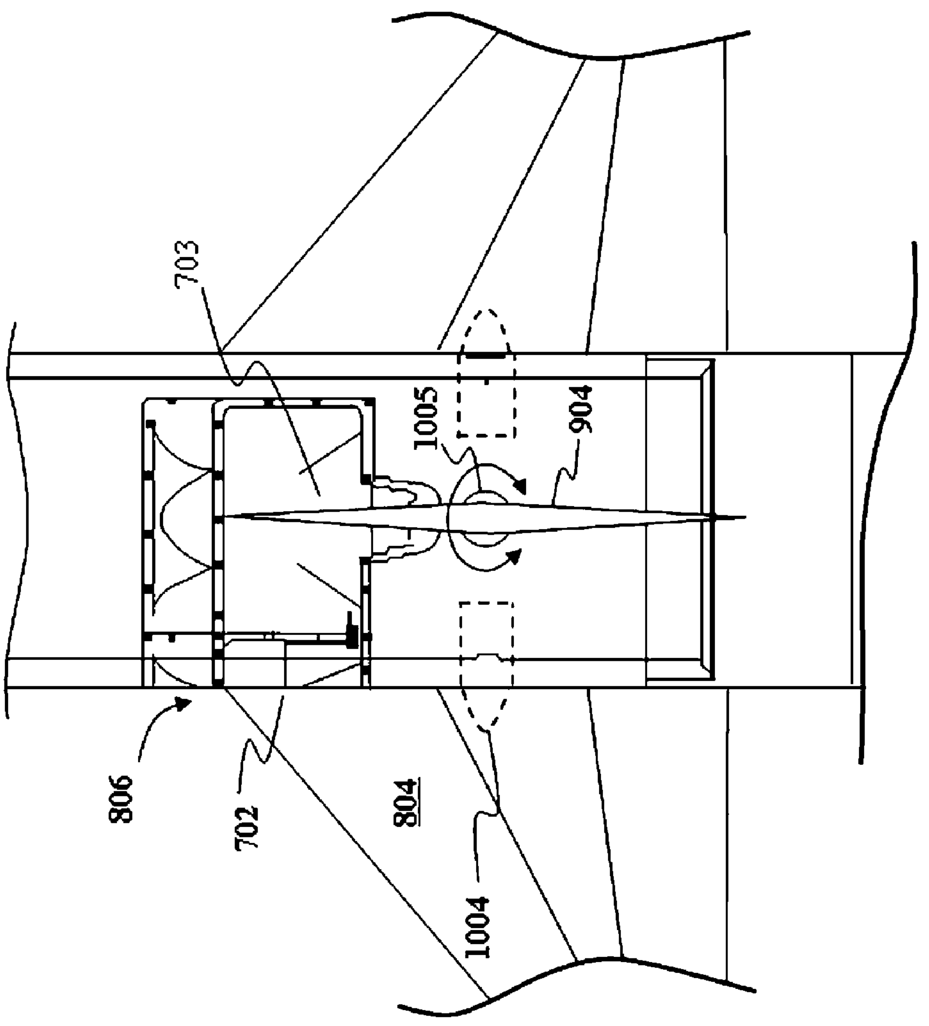
FIG. 10 illustrates a side view of an embodiment of the present invention.
Figure 11:
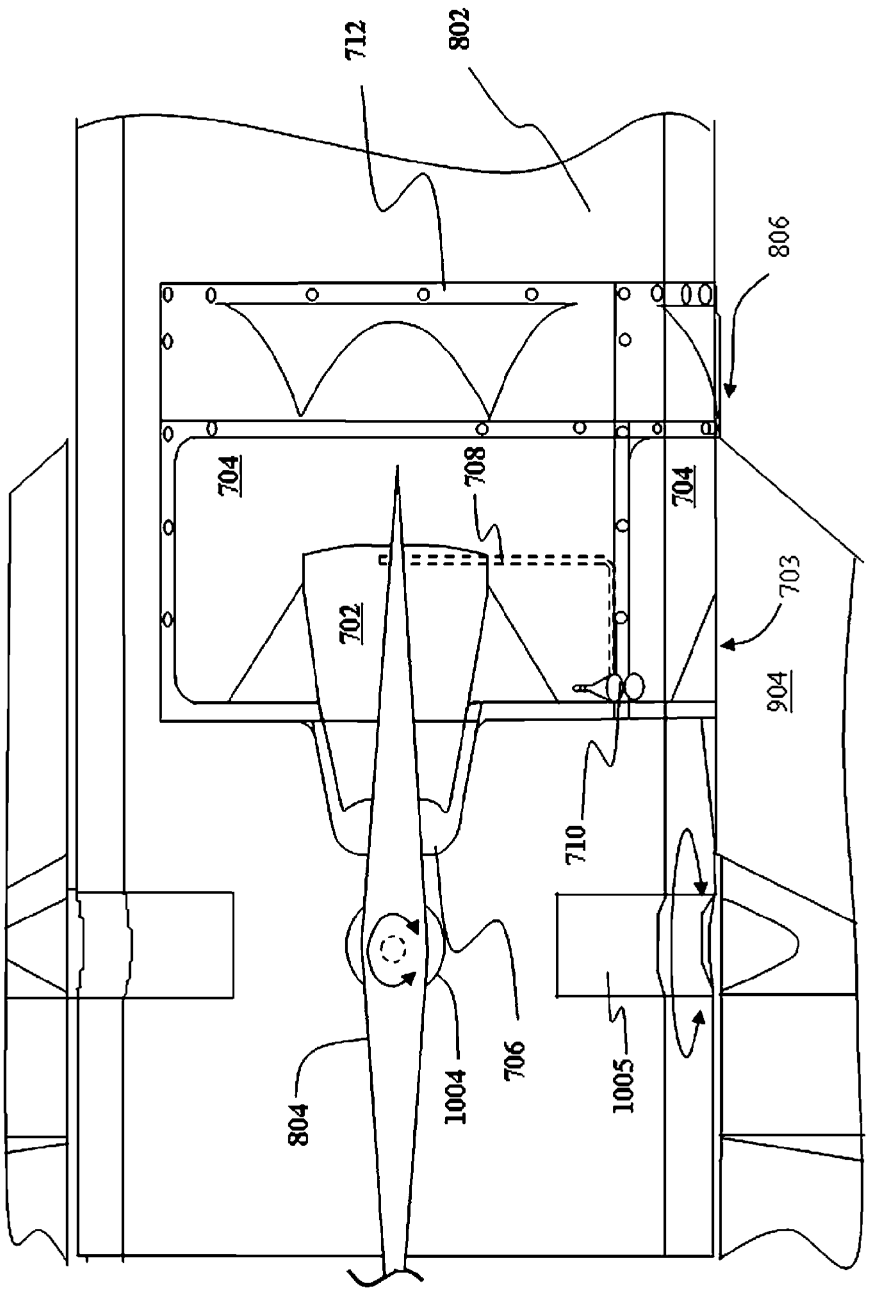
FIG. 11 illustrates an expanded view of an embodiment of the present invention.

In other embodiments, the angular rotation of the first member may be limited. For example, the limited rotational travel of the first member is present in embodiments where the first member is a lifting, stabilizing, or control surface of an air vehicle and the second body or member is the air vehicle fuselage or some other air vehicle surface. FIG. 6 illustrates an embodiment of the present invention where a dielectric element 610 has a bottom side (not depicted) that may be mounted in a conformal fashion to an air vehicle fuselage as an example of a structural member 605 and a substantially flat top surface or side 620, typically a dielectric region, having within it and below its top surface, a capacitive surface 630 providing a capacitive element coupling area recessed below the top surface 620. A substantially triangular perimeter of a leading portion of an exemplary wing 640 as a rotating member about a shaft 642 is also shown. In addition, the exemplary embodiment illustrates a placement of an optional leading edge fairing 650 having one or more surface regions of metal or dielectric material.

Where the air vehicle is an axially symmetric missile having cruciform lifting, stabilizing or controlling surfaces and where the missile, although preferably controlled in the roll axis, i.e., rotationally stabilized about the air vehicle centerline, may roll when turning or banking, a currently preferred embodiment for antenna elements having a generally upwardly directed portion of each of their beam patterns has at least two antennas, each at one of two contiguous stations where the control surfaces are attached, such as the upper two stations of the x-oriented air vehicle. FIG. 7 illustrates an embodiment of the invention for such an exemplary application. While the embodiment in this example is fashioned as an attachment to an existing airframe, the requisite surfaces may be integral to the airframe without loss of scope, as encompassed by the present invention. FIG. 7 illustrates, in perspective view, an exemplary embodiment where a conductor region 702 is embedded in a dielectric layer 704. The dielectric layer 704 is supported, in this example, by a frame 706 and a transmission line 708 (shown in dashed lines) passes through the dielectric layer 704 to contact the conductor region 702. The transmission line 708 may connect to a transmitting device contained within an air vehicle (not shown) to which the assembly embodiment is connected via a connector 710. A fairing 712 may detachably attach to the dielectric, or the frame in embodiments having a supportive frame, to enhance aerodynamic characteristics, for example. FIG. 8 illustrates, in a side view, an exemplary substantially flat capacitive region 703 of one of the two driving portions of the present embodiment. FIG. 9 illustrates, in a side view, some of the elements for generating a front or first free space gap 806. The frame 706 is detachably attached to a structural member such as an air vehicle body 802. The transmission line 708 electrically, and preferably, mechanically, connects with the conductor region 702. FIG. 10 illustrates, in a side view, an embodiment detachably attached to the outer surface of an air vehicle adapted to capacitively couple two of the control surfaces as two dipole antennas. In this example, a horizontal wing 804 and a vertical wing 904 each are positioned over capacitive regions 702, 703. Preferably, the desired capacitance across the free space gap 806 is maintained during the rotation of the wings 804, 904 about their respective shafts 1004, 1005. FIG. 11 provides an expanded view of the top antenna of this exemplary embodiment and the forward or first free space gap 806 of the side antenna. For those embodiments where the first members comprise airfoils or air vehicle control surfaces, one or more wideband UHF antennas may be readily produced in accordance with the teachings of the present invention. The active components are external to the missile skin with the capacitive surface transmission lines penetrating to the interior of the missile where a transmitting apparatus may be located and adapted to receive the transmission line. This packaging approach maximizes the use of the internal volume of the air vehicle. The capacitive surface, or active component, produces an electric field across the gap between the control surface and the missile skin to couple the input transmission line to the control surface. The control surface pivots around a grounded shaft that acts as the central ground between the two open-ended, nominally quarter-wavelength slots. The excited slot on the leading edge couples to the trailing slot with a 180 degree delay. The combined fields produce the equivalent of a dipole element on the surface of the air vehicle. The coupling element may desirably maintain a substantially constant capacitance to the control surface over the operational range of control surface movement.

Extensive testing shows the pattern coverage of the element is usable over +/−90 degrees in roll around the wing, i.e., about the air vehicle centerline. Beyond 90 degrees, the pattern rolls off due to blockage from the missile body. The use of two control surfaces, for example, the 90 degree separation in roll for a cruciform control surface configuration, maintains upper hemispherical coverage while roll is greater than +/−135 degrees where the pattern shape in pitch is equivalent to that of a dipole.

One exemplary air vehicle embodiment includes a dielectric block located on an air vehicle surface, or skin surface, under a particular control surface. The inner surface of the block is conformal to the missile skin and the outer surface is flat where the movement of the control surface runs parallel to this surface. Internal to the dielectric block near the outer surface is a coupling element. This element may be shaped to maintain constant capacitance between it and the control surface over its operational range of motion. The range in the air gap height between the drive element assembly and the control surface is, in a currently preferred embodiment, repeatably bounded and within a distance supportive of a practicable VSWR, e.g., less than three. For those antenna embodiments where the range is 340 to 390 MHz for example, a forward air gap of 0.020 inch provides a VSWR value of approximately two and for air gaps of 0.020 to 0.060 inch, the VSWR is less than three.

Figure 12:
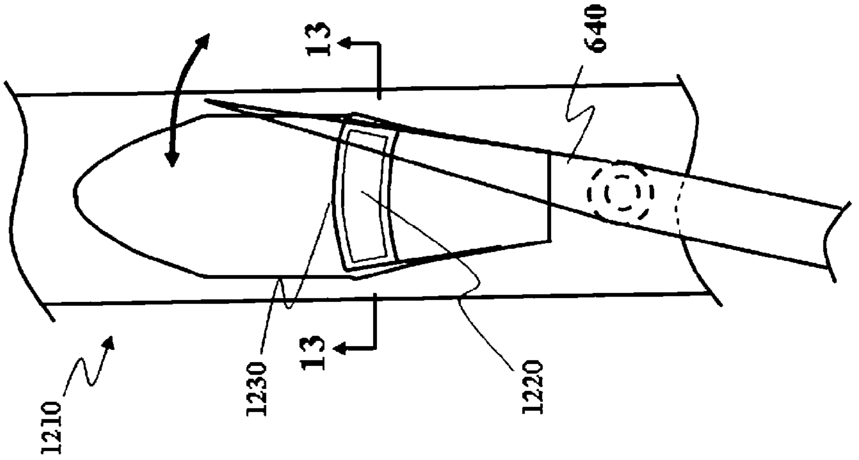
FIG. 12 illustrates an exemplary airframe embodiment of the present invention.
Figure 13:
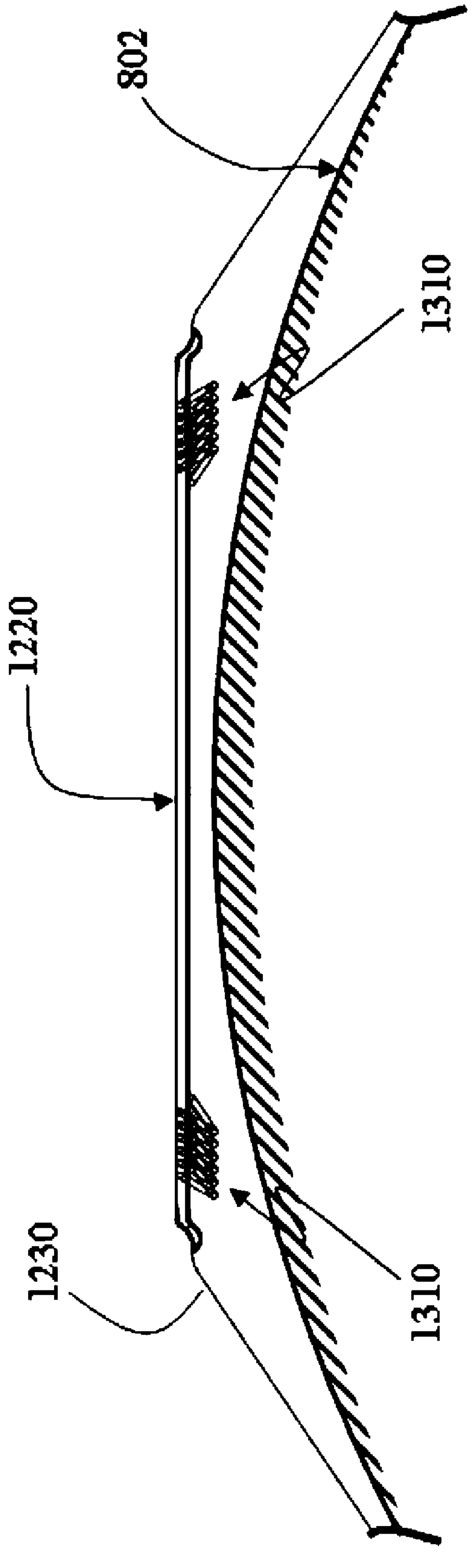
FIG. 13 illustrates in side view an exemplary insulated resilient contact embodiment of the present invention.

FIG. 12 illustrates an exemplary airframe embodiment of the insulated resilient contact of FIGS. 3, 4A, and 4B. In this exemplary embodiment shown in a top view, the motion of the wing 640, shown in outline from above a fuselage portion 1210, sweeps a portion of the lower edge of the wing 640 across a coupling element area 1220 conformal to, or recessed within, a compliant portion 1230. FIG. 13 illustrates, in a cross-sectional view, an example of a raised portion of an insulated spring contact embodiment having a compliant support and RF connection components 1310 disposed laterally from one another. This exemplary design incorporates an insulated, or direct-coupled, sliding contact with an underside of the control surface. Such embodiments maintain the design capacitance or direct connection between the coupling element and the control surface over variations in control surface-to-missile skin gap dimension by incorporating a compliant coupling element interface. Exemplary maximum height tolerances for rotating airfoil embodiments are expected to be +/−0.035 inch with a root-sum-square tolerance of 0.018 inch.

As will be appreciated by those of ordinary skill in the art, the use of a control surface or other movable airfoil of a missile extends the effective volume of the radiating structure without the need to use the limited, internal missile volume. The present invention, as disclosed in the exemplary embodiments, enables efficient coupling to the control surface by taking advantage of the existing missile components, e.g., the missile skin and the wings, control surfaces or other movable airfoils, without modification beyond the attachment of the embodied assembly. In light of internal volume and allowed surface area limitations of missile systems, the currently preferred embodiment minimizes both the internal and external volumes required to support efficient coupling to free space by incorporating existing missile components as the radiating element. The volume of the control surface extends the fields away from the missile, substantially increasinging the efficiency and bandwidth of the antenna.

Figure 14:
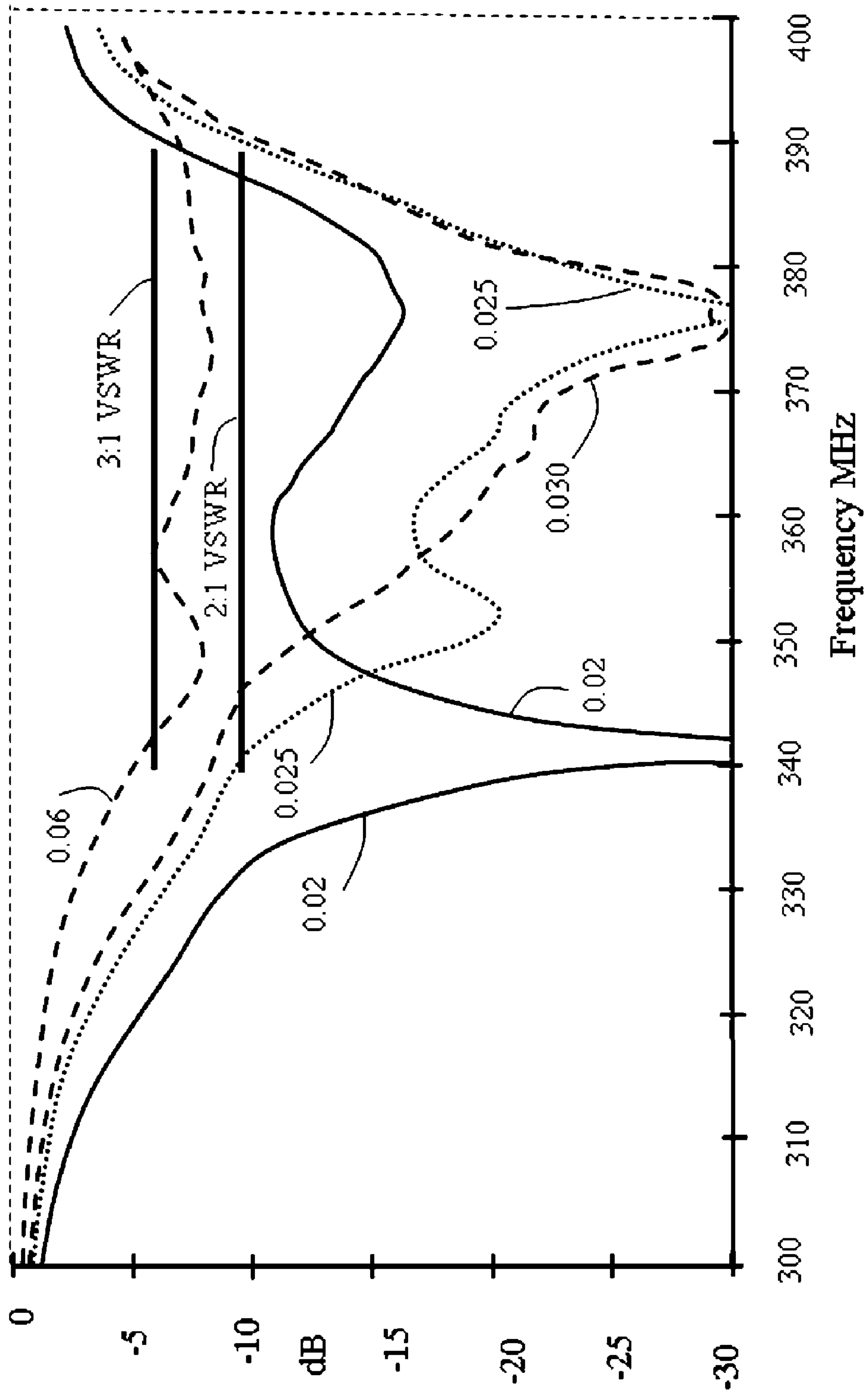
FIG. 14 graphically illustrates in a frequency response plot exemplary return losses for various air gaps.
Figure 15:
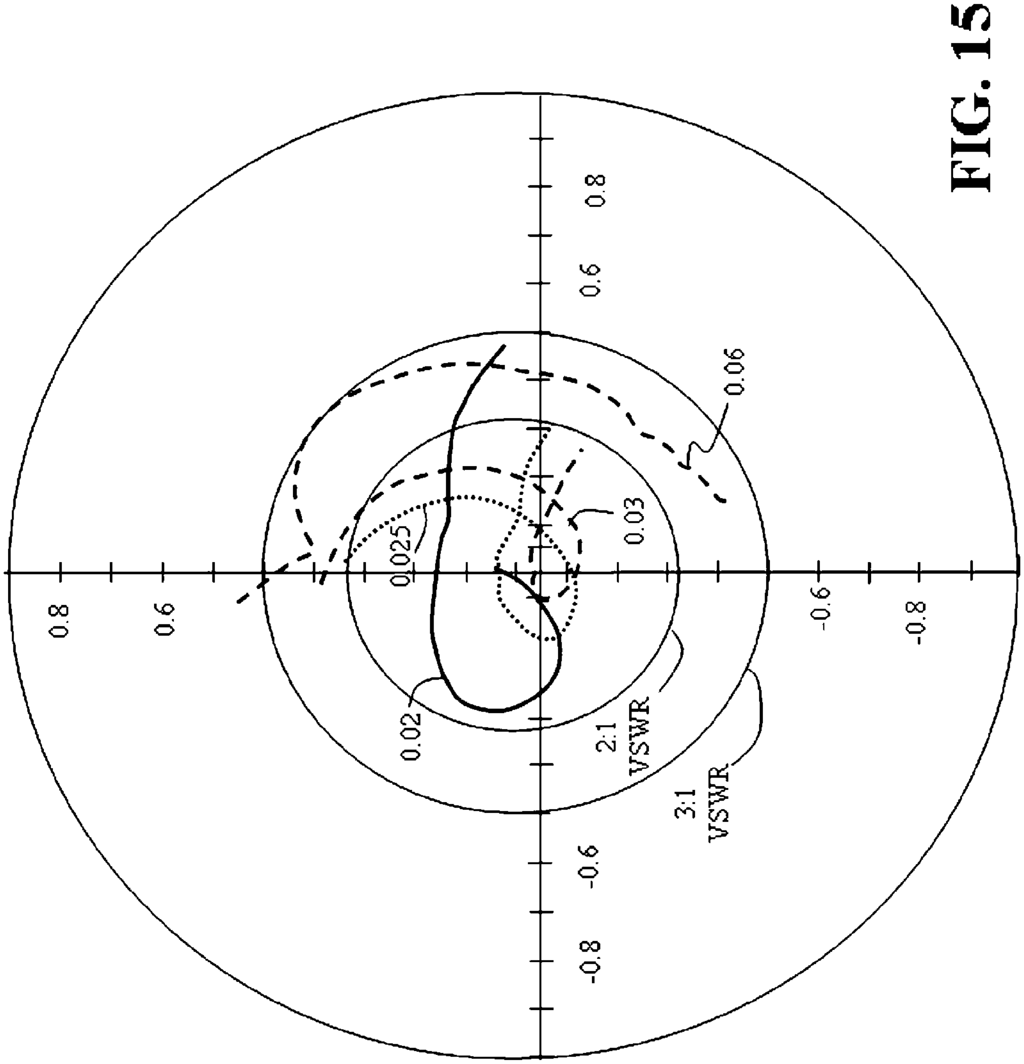
FIG. 15 graphically illustrates in a complex impedance plot exemplary voltage standing wave ratio sensitivities to various air gaps.
Figure 16:
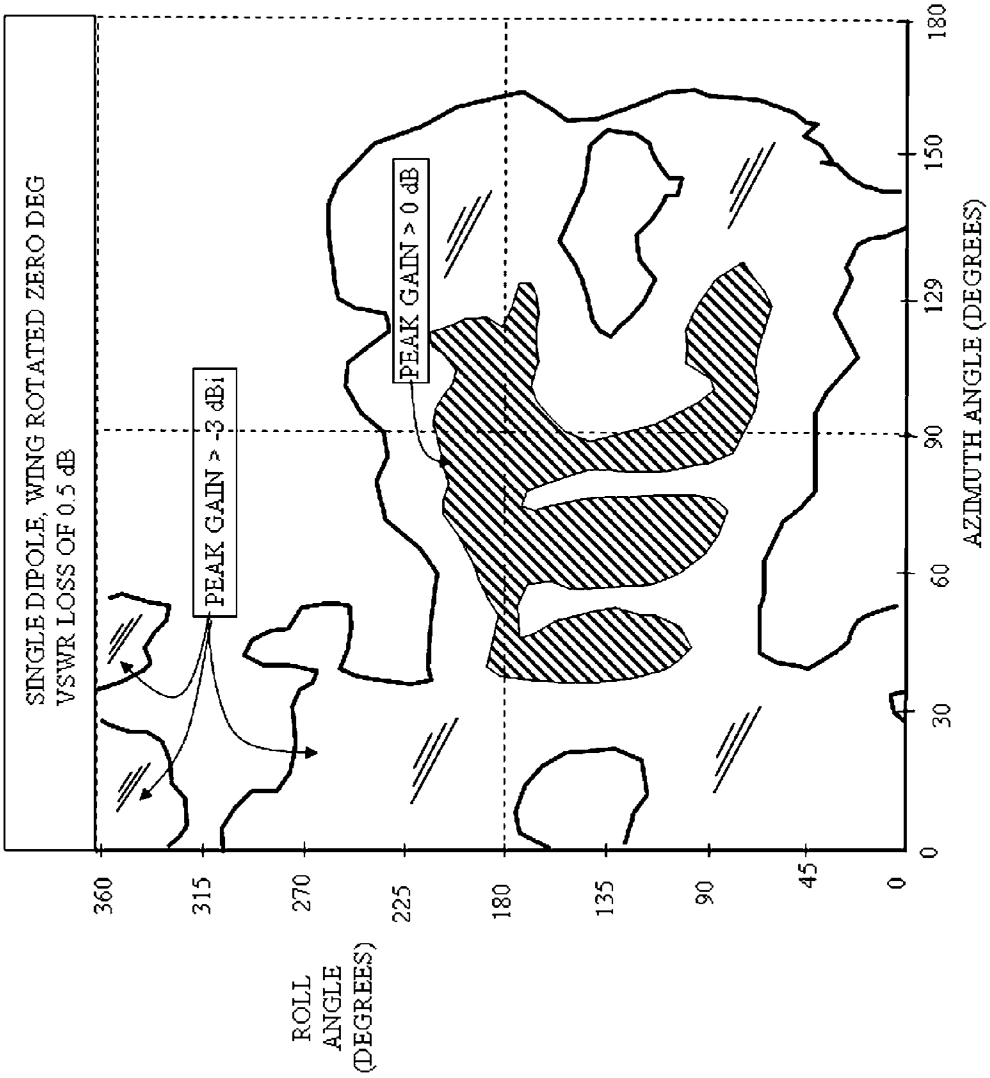
FIG. 16 is an exemplary antenna gain contour of an embodiment of the present invention.
Figure 17:
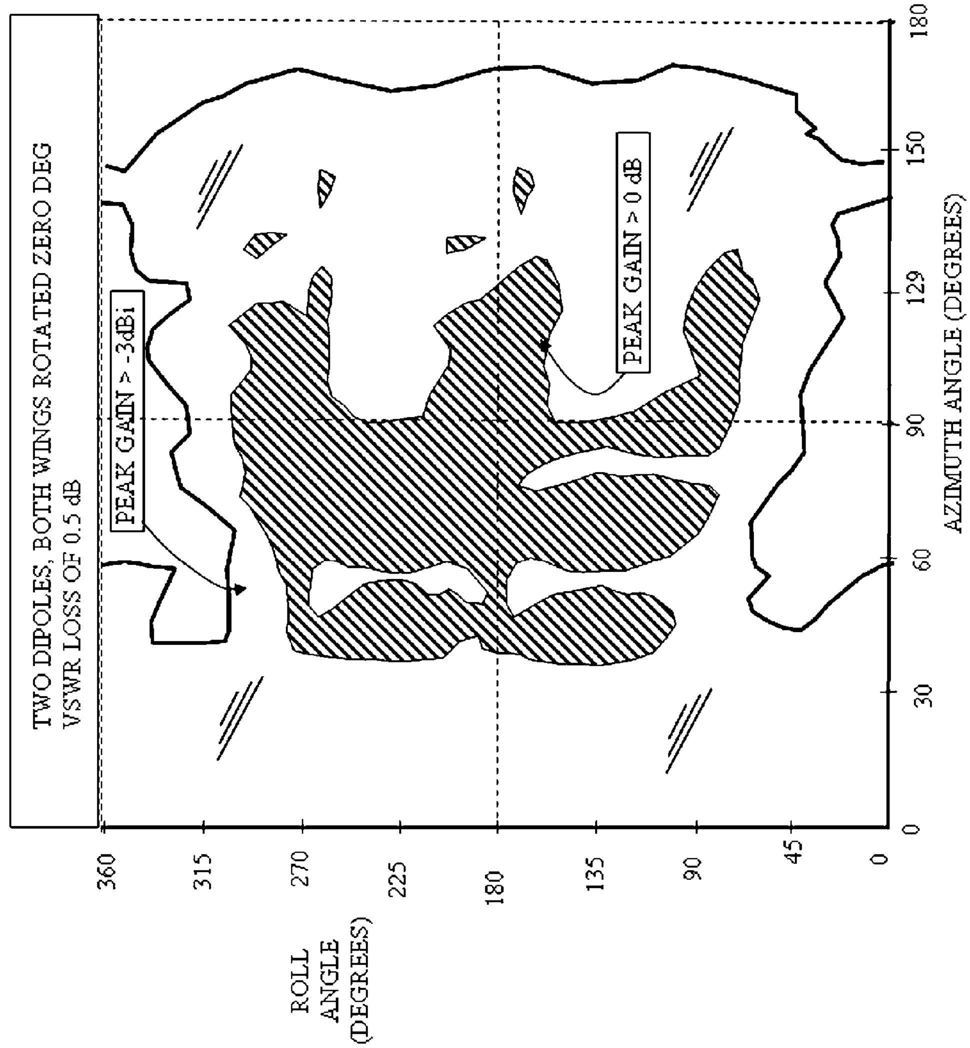
FIG. 17 is an exemplary antenna gain contour of an embodiment of the present invention.
Figure 18:
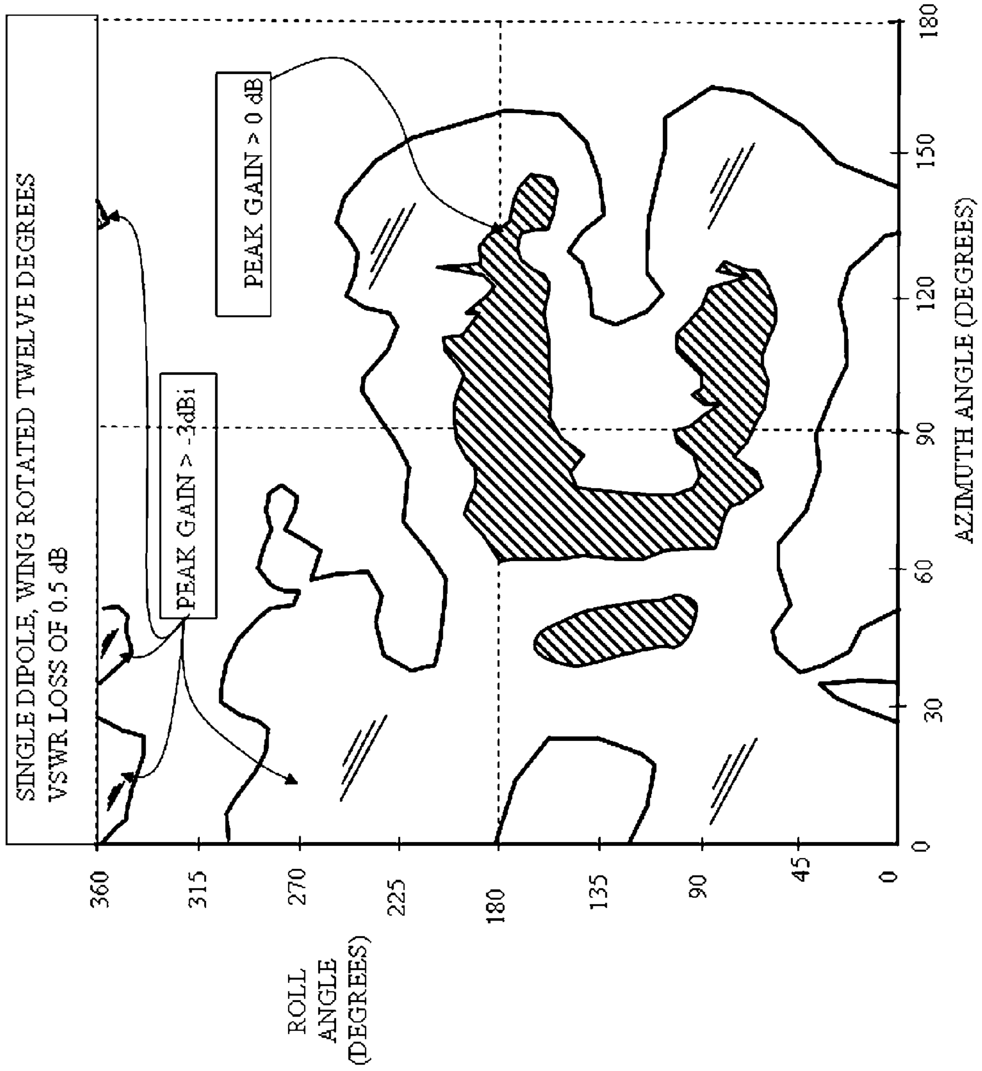
FIG. 18 is an exemplary antenna gain contour of an embodiment of the present invention.
Figure 19:
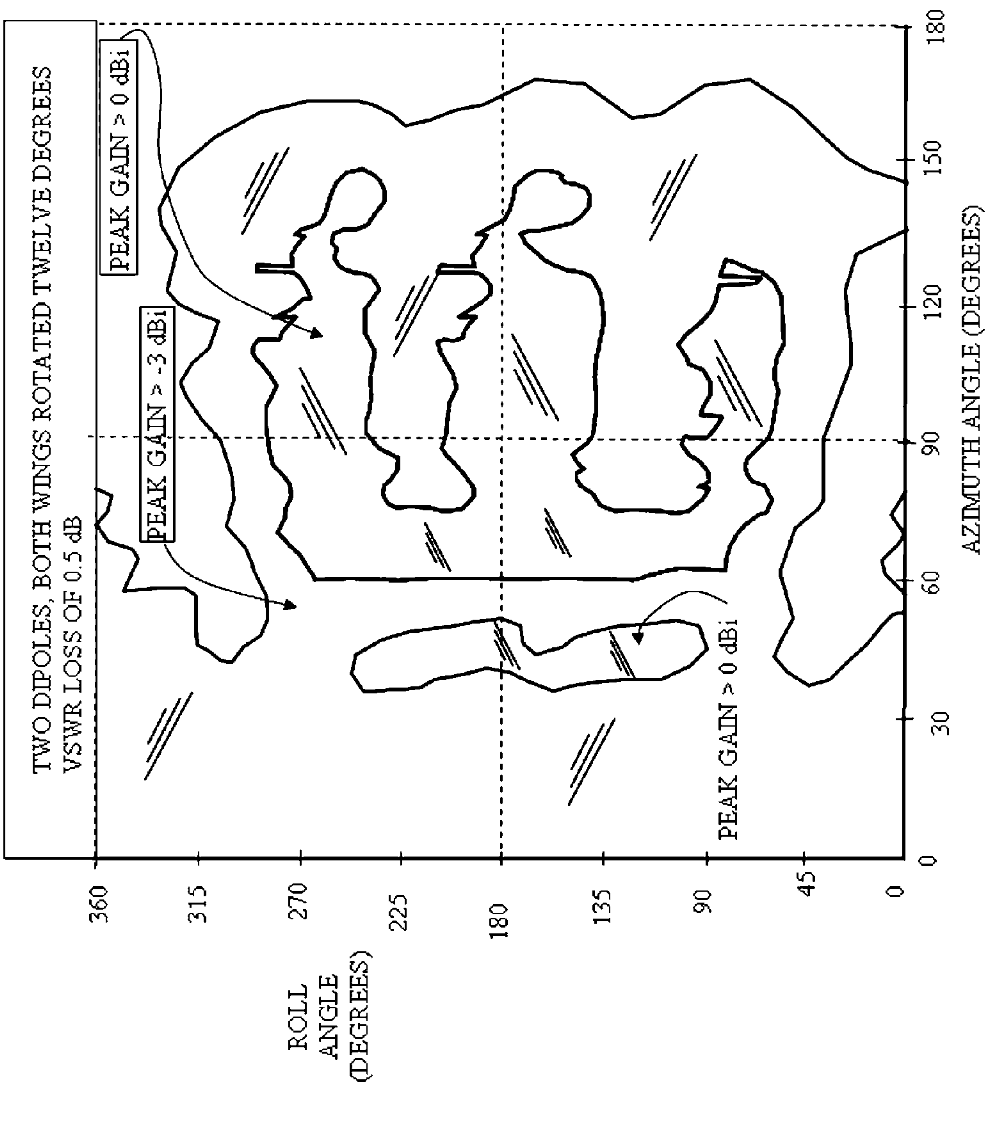
FIG. 19 is an exemplary antenna gain contour of an embodiment of the present invention.
Figure 20:
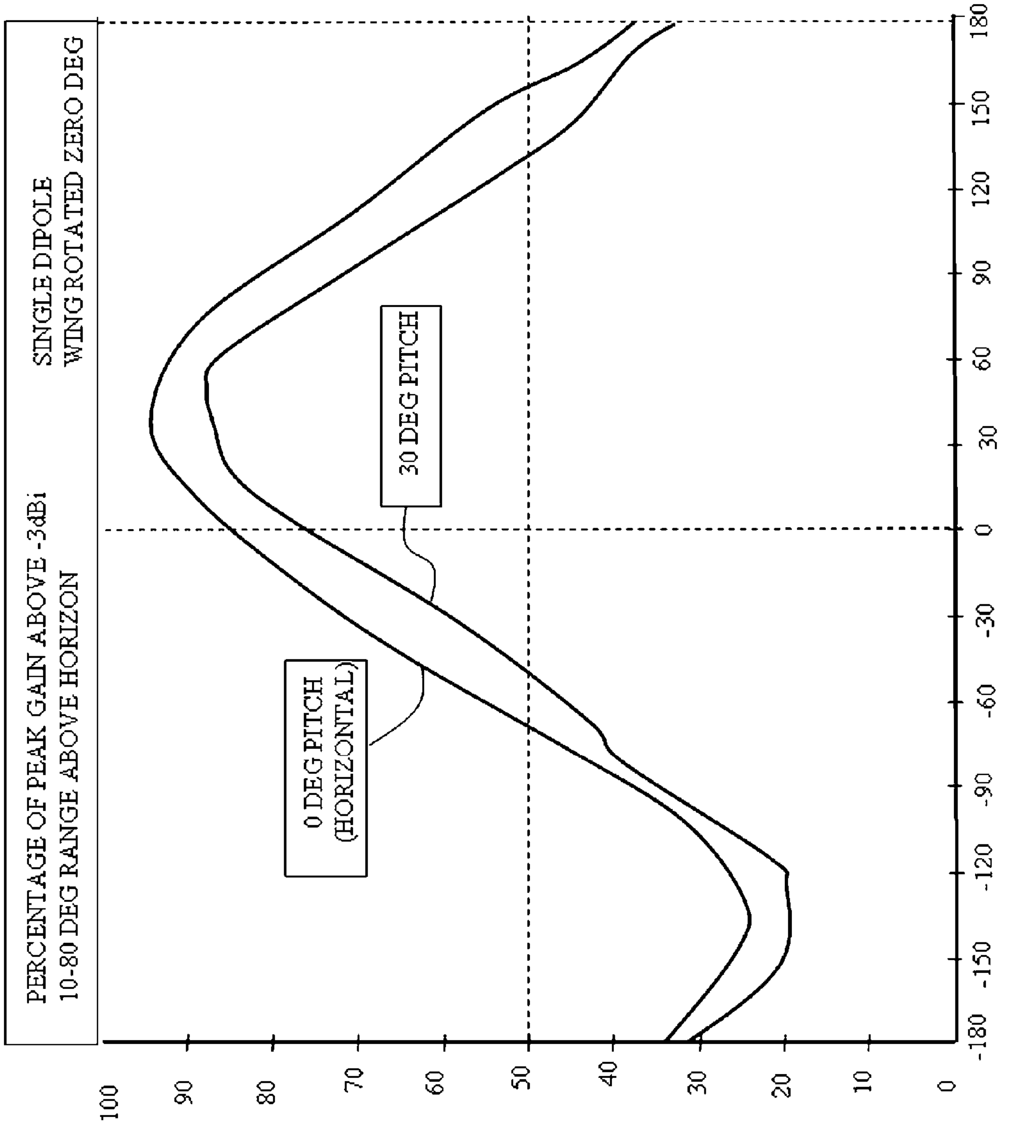
FIG. 20 is an exemplary antenna gain percentage coverage of an embodiment of the present invention.
Figure 21:
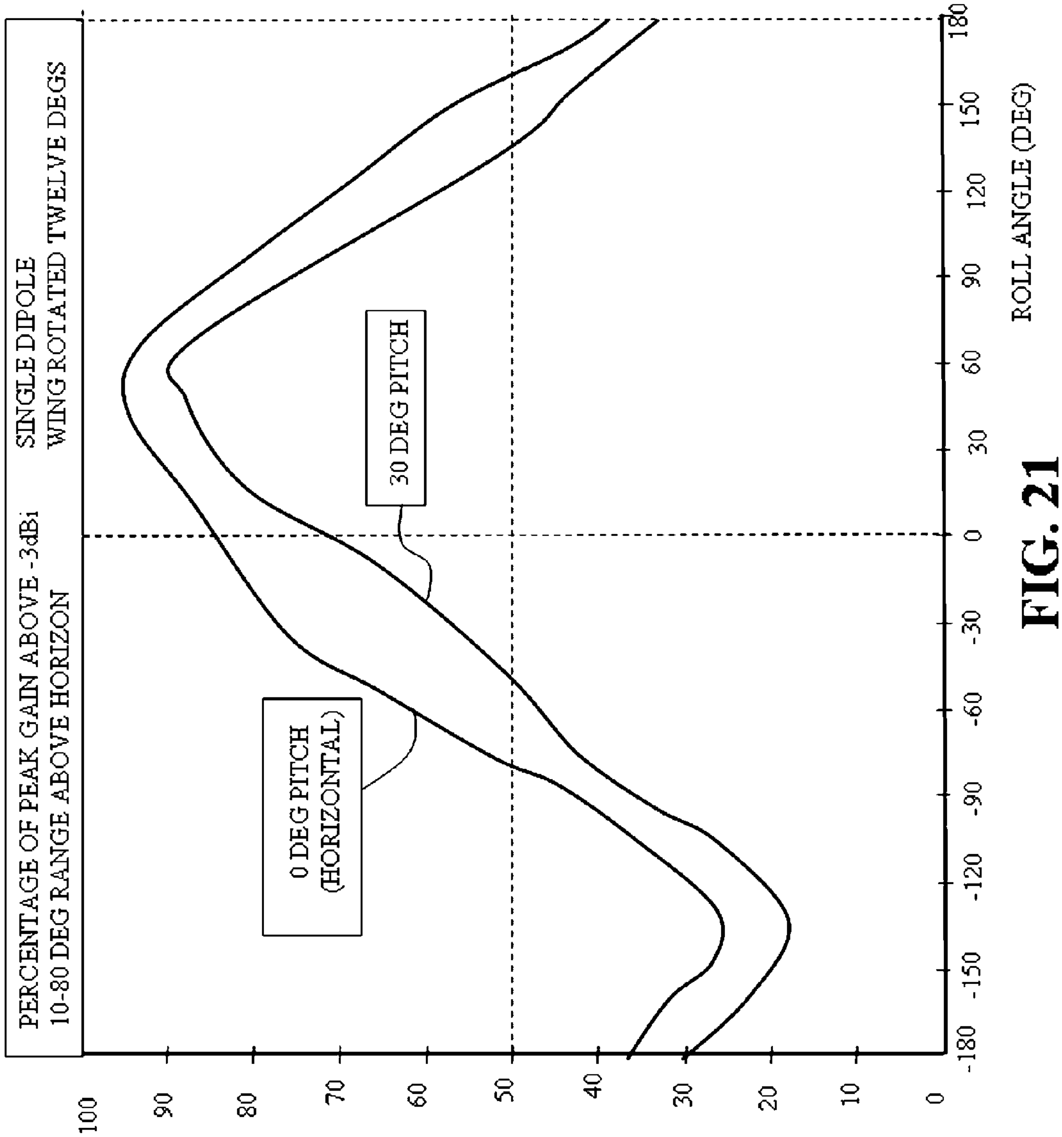
FIG. 21 is an exemplary antenna gain percentage coverage of an embodiment of the present invention.
Figure 22:
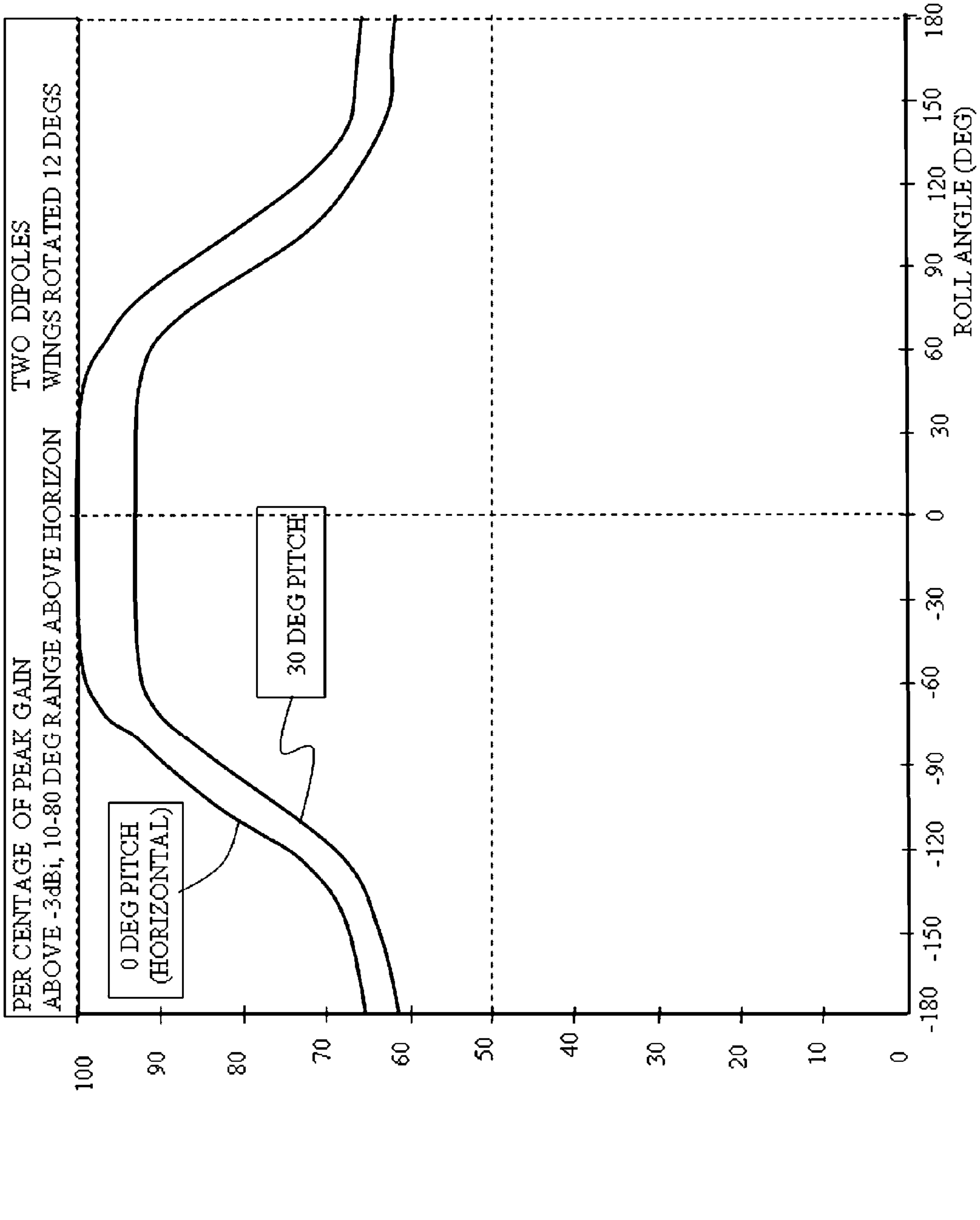
FIG. 22 is an exemplary antenna gain percentage coverage of an embodiment of the present invention.
Figure 23:
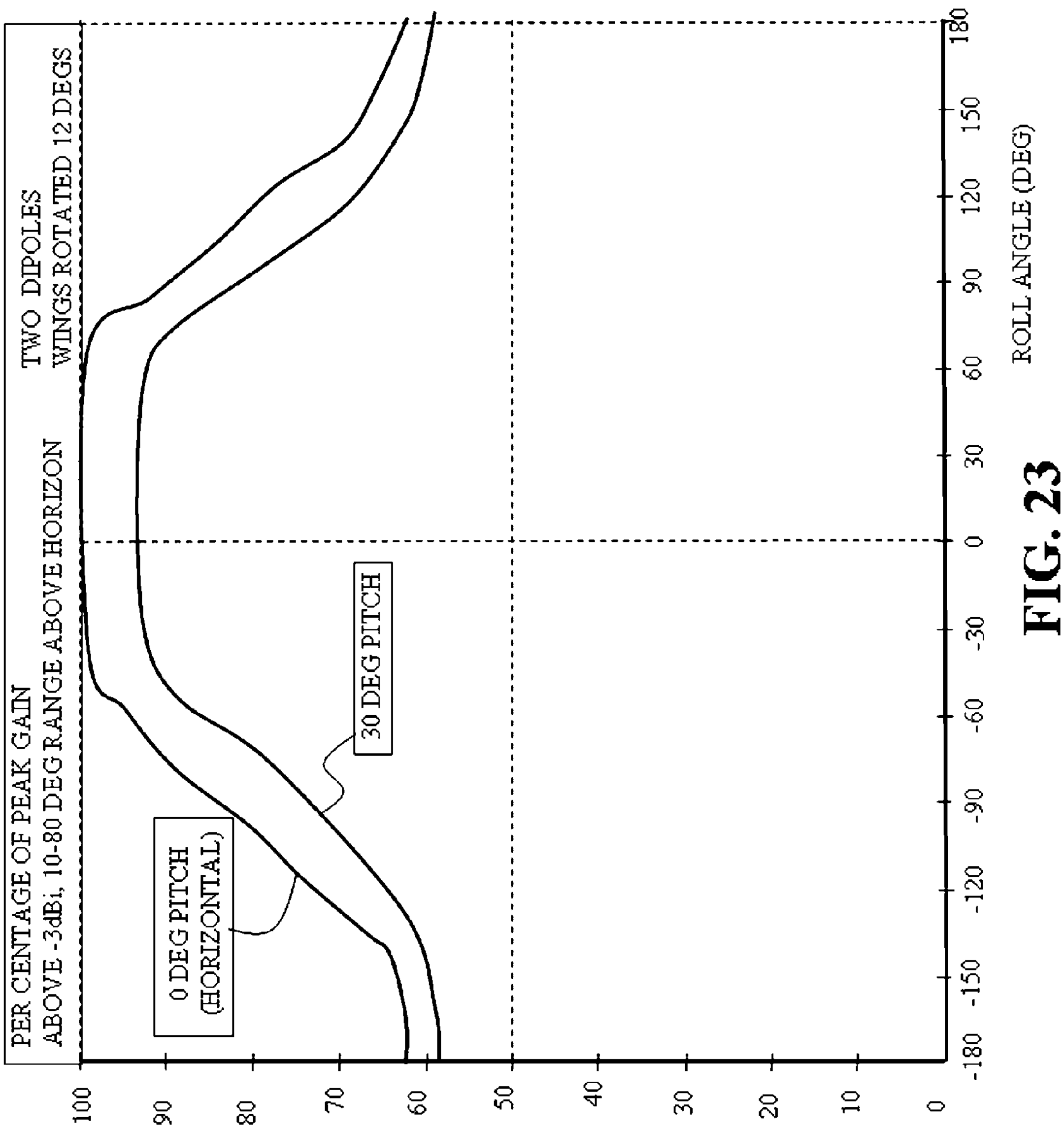
FIG. 23 is an exemplary antenna gain percentage coverage of an embodiment of the present invention.

Illustrated in FIGS. 14 and 15 are the respective return loss and VSWR sensitivities to the forward air gap spacing across a frequency range. FIG. 14 illustrates that for air gaps of 20, 25 and 30 mils, a VSWR of 2 or less can be maintained over a substantial portion of the frequency range from 340 to 390 MHz and for air gaps up to 60 mils, a VSWR of 3 or less can be maintained over this same frequency range. FIG. 15 illustrates in a complex impedance plot that over such an operational bandwidth as 340 to 390 MHz, a VSWR of 3 or less is maintained for gaps of less than 60 mils.

Illustrated in FIGS. 16 to 19 for one or two antenna elements having, for a VSWR loss of 0.5 dB, antenna gain contours where the gain counters shown are above 0 dBi and −3 dBi for a first rotational wing position relative to a principal structural reference axis of zero degrees, that is, in-line, and for a second rotational wing position relative to the principal structural reference of twelve degrees.

Illustrated in FIGS. 20 to 23 for one or two antenna elements, whether deflected, in these examples to twelve degrees, or parallel with the air vehicle centerline, are percentages of antenna coverage depending on roll and pitch angles of the air vehicle where percentage coverage is represented based on the total area within the +10° to +80° elevation above the local horizon for which the gain was greater than −3 dBi. The percentage coverage is plotted as a family of curves representative of selected air vehicle pitch angles from 0 degrees, that is horizontal, to 30 degrees, that is, air vehicle nose down, against roll, where the zero roll angle is lugs up, that is, the missile with cruciform airfoil configuration is in an X orientation, rather than the + orientation. In the case of a two-element configuration, the maximum of the two patterns were used in the percentage calculations.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims.

The definitions of the words or elements of the following claims are, therefore, defined in this specification to include not only the combination of elements which are literally set forth, but all equivalent structure, material or acts for performing substantially the same function in substantially the same way to obtain substantially the same result. In addition to the equivalents of the claimed elements, obvious substitutions now or later known to one with ordinary skill in the art are defined to be within the scope of the defined elements.

What is claimed is:

1. An antenna comprising:

a first member comprising:

a conductive first edge; and an extension, the extension having a principal axis of rotation; and wherein the first member is adapted to rotate relative to a second member about the principal axis of rotation;

a drive element comprising a conductive second surface mounted to the second member proximate to at least a first portion of the conductive first edge wherein the conductive second surface is isolated from the second member;

the second member adapted to receive the extension;

wherein the antenna is adapted to generate a driving capacitive coupling between at least a first portion of the conductive first edge of the first member and at least a portion of the conductive second surface across a first free space gap formed by the first portion of the conductive first edge proximate to the portion of the conductive second surface and wherein the first member is electrically grounded to the second member via the extension.

2. The antenna of claim 1, wherein the second member further comprises a conductive first surface proximate to at least a second portion of the conductive first edge and wherein the antenna is adapted to generate capacitive coupling between at least a second portion of the conductive first edge of the first member and at least a portion of the conductive first surface across a second free space gap formed by the second portion of the conductive first edge proximate to the portion of the conductive first surface.

3. The antenna of claim 1, wherein the first free space gap is maintained by a flexible surface member interposed between the first portion of the conductive first edge and the portion of the conductive second surface.

4. An antenna comprising:

a third member having a principal axis of rotation;

a first member adapted to receive the third member, the first member comprising a conductive first edge, wherein the first member is adapted to rotate relative to a second member about the principal axis of rotation; and a drive element comprising a conductive second surface mounted to the second member proximate to at least a first portion of the conductive first edge wherein the conductive second surface is isolated from the second member;

the second member adapted to receive the third member;

wherein the conductive first edge is electrically grounded to the second member via the third member; and wherein the antenna is adapted to generate a driving capacitive coupling between at least a first portion of the conductive first edge of the first member and at least a portion of the conductive second surface across a first free space gap formed by the first portion of the conductive first edge proximate to the portion of the conductive second surface.

5. The antenna of claim 4, wherein the second member further comprises a conductive first surface proximate to at least a second portion of the conductive first edge and wherein the antenna is adapted to generate capacitive coupling between at least a second portion of the conductive first edge of the first member and at least a portion of the conductive first surface across a second free space gap formed by the second portion of the conductive first edge proximate to the portion of the conductive first surface.

6. The antenna of claim 4, wherein the first free space gap is maintained by a flexible surface member interposed between the first portion of the conductive first edge and the portion of the conductive second surface.

7. An antenna comprising:

a first member comprising an air vehicle control surface, the first member directly rotatably mounted to a fuselage of the air vehicle and having a conductive first edge proximate thereto; and a second member secured to the fuselage of the air vehicle and comprising a conductive second surface proximate to at least a first portion of the conductive first edge, a first free space air gap being defined between the first portion of the conductive first edge and the conductive second surface;

the antenna being configured to generate a driving capacitive coupling across the first free space gap via the conductive second surface; and wherein the conductive second surface is insulated from the fuselage and wherein the conductive first edge is electrically grounded to the fuselage.

8. The antenna of claim 7, wherein the fuselage further comprises a conductive first surface proximate to at least a second portion of the conductive first edge, a second free space gap being defined therebetween, the antenna being configured to generate capacitive coupling across the second free space gap.

9. The antenna of claim 7, wherein the first free space gap is maintained by a flexible member interposed between the first portion of the conductive first edge and the portion of the conductive second surface.

10. An air vehicle comprising:

a fuselage having at least one control surface projecting externally therefrom and directly rotatably mounted thereto;

at least one first antenna component comprising at least a portion of the at least one control surface; and at least one second antenna component carried by and insulated from the fuselage;

wherein the at least one first antenna component and the at least one second antenna component are mutually positioned and wherein the at least one second antenna component is adapted to generate a driving capacitive coupling therebetween and wherein the at least one first antenna component is grounded to the fuselage.

11. The air vehicle of claim 10, wherein the at least one control surface comprises a plurality of control surfaces.

12. The air vehicle of claim 11, wherein the plurality of control surfaces are circumferentially spaced about the fuselage.

13. The air vehicle of claim 12, wherein the plurality of control surfaces is circumferentially spaced at substantially 90 degree intervals.

14. The air vehicle of claim 10, further including a drive circuit disposed within the fuselage and operably coupled to the at least one second antenna component.

15. The antenna of claim 2, wherein the first free space gap is maintained by a flexible surface member interposed between the first portion of the conductive first edge and the portion of the conductive second surface.

* * * * *